United States Patent
Lee et al.

(10) Patent No.: US 12,450,164 B2
(45) Date of Patent: Oct. 21, 2025

(54) MEMORY MANAGEMENT UNIT AND METHOD OF WALKING PAGE TABLE

(71) Applicant: SAMSUNG ELECTRONICS CO., LTD., Suwon-si (KR)

(72) Inventors: Jiwon Lee, Seoul (KR); Won Woo Ro, Seoul (KR); Ipoom Jeong, Seoul (KR); Hongju Kal, Seoul (KR); Gun Ko, Seoul (KR); Hyunwuk Lee, Seoul (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 148 days.

(21) Appl. No.: 18/502,058

(22) Filed: Nov. 5, 2023

(65) Prior Publication Data
US 2024/0202136 A1    Jun. 20, 2024

(30) Foreign Application Priority Data
Dec. 15, 2022  (KR) ................. 10-2022-0175909

(51) Int. Cl.
*G06F 12/1027*  (2016.01)
*G06F 12/1009*  (2016.01)

(52) U.S. Cl.
CPC ...... *G06F 12/1027* (2013.01); *G06F 12/1009* (2013.01)

(58) Field of Classification Search
CPC .......... G06F 12/1027; G06F 2212/681; G06F 2212/684; G06F 12/1009; G06F 12/1045; G06F 2212/1012; G06F 2212/1024; G06F 2212/1028; G06F 2212/652; G06F 2212/657; G06F 12/0882; G06F 2212/50
See application file for complete search history.

(56) References Cited

U.S. PATENT DOCUMENTS

| | | | | |
|---|---|---|---|---|
| 6,012,132 | A * | 1/2000 | Yamada | G06F 12/1009 |
| | | | | 711/205 |
| 9,069,690 | B2 | 6/2015 | Hildesheim et al. | |
| 9,710,393 | B2 | 7/2017 | Lemay et al. | |
| 10,169,091 | B2 | 1/2019 | Barrow-Williams et al. | |
| 10,185,498 | B2 | 1/2019 | Roberts | |
| 2012/0297131 | A1 | 11/2012 | Chung et al. | |
| 2017/0185528 | A1* | 6/2017 | Hansson | G06F 12/1009 |
| 2018/0189190 | A1 | 7/2018 | Kaplan et al. | |
| 2020/0364152 | A1* | 11/2020 | Park | G06F 12/1027 |
| 2021/0182206 | A1 | 6/2021 | Raasch et al. | |

* cited by examiner

*Primary Examiner* — Francisco A Grullon
(74) *Attorney, Agent, or Firm* — Morgan, Lewis & Bockius LLP

(57) ABSTRACT

A memory management unit includes a TLB configured to cache PTEs including a mapping between a virtual and a physical frame number, and to convert a virtual address into a physical address using the cached PTEs. A page table walk request queue is configured to queue page requests corresponding to a virtual page number when a TLB miss is occurred, and one or more PTWs are configured to acquire a PTE from the main memory, and to convert the virtual page numbers into physical frame numbers using the PTE. A PTW is configured to select associated page table walk requests having the same base address of corresponding virtual page numbers, to consecutively provide cache line requests for acquiring PTEs corresponding to the associated page table walk requests, to acquire the PTEs corresponding to the associated PTE requests, and to provide the acquired PTEs to the TLB.

20 Claims, 18 Drawing Sheets

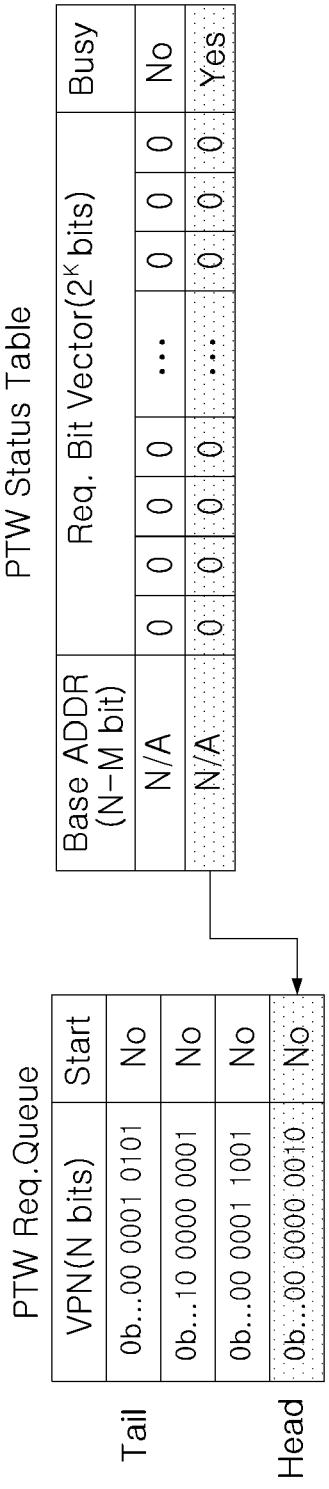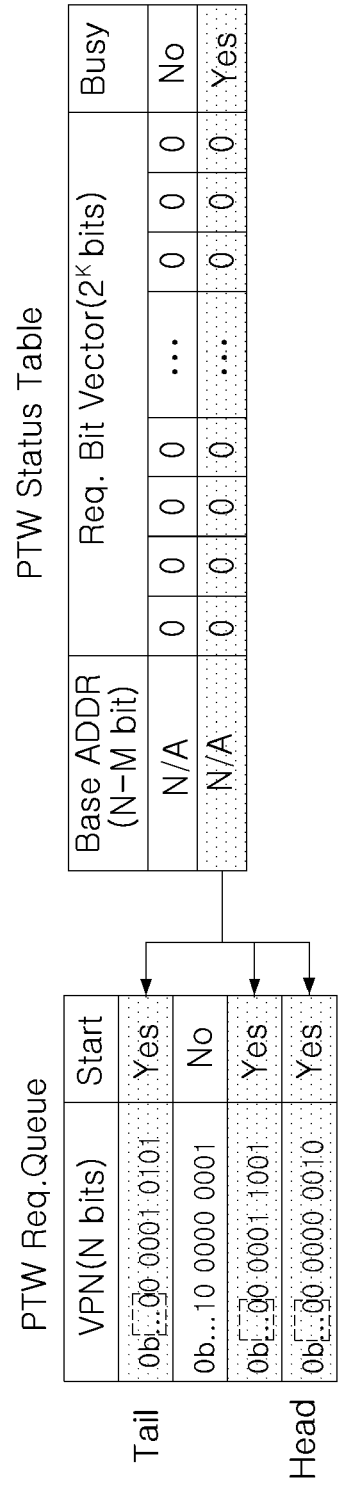
FIG. 6A
FIG. 6B

PTW Req.Queue

| VPN(N bits) | Start |
|---|---|
| – | – |
| – | – |
| – | – |
| 0b...10 0000 0001 | No |

Tail (top) / Head (bottom)

PTW Status Table

| Base ADDR (N–M bit) | Req. Bit Vector($2^K$ bits) | | | | | | | | Busy |
|---|---|---|---|---|---|---|---|---|---|
| N/A | 0 | 0 | 0 | 0 | ... | 0 | 0 | 0 | No |
| N/A | 0 | 0 | 0 | 0 | ... | 0 | 0 | 0 | No |

FIG. 6E

MEMORY MANAGEMENT UNIT AND METHOD OF WALKING PAGE TABLE

CROSS-REFERENCE TO RELATED APPLICATION(S)

This application claims priority to Korean Patent Application No. 10-2022-0175909 filed on Dec. 15, 2022 in the Korean Intellectual Property Office, the disclosure of which is herein incorporated by reference in its entirety.

TECHNICAL FIELD

The present disclosure relates to memory and, more specifically, to a memory management unit and a method of walking a page table.

DISCUSSION OF THE RELATED ART

Various processors in a computer system, including central processing units (CPUs) and graphics processing units (GPUs), access main memory using a virtual address for compatibility and efficiency. A memory management unit assists the processors in accessing the main memory by converting the virtual address to a physical address of the main memory.

A page table having mapping information of a virtual address and a physical address may be stored in the main memory. When an access request is received for a virtual address, the memory management unit may perform a page table walk for searching a page table stored in the main memory to find a physical address corresponding to the virtual address.

The page table walk speed may be slow as compared to the processing speed of the processor, and frequent page table walks may cause a bottleneck in the processor that may reduce system performance.

SUMMARY

A memory management unit including a translation lookaside buffer (TLB) is configured to cache page table entries (PTEs) including a mapping relationship between a virtual page number and a physical frame number, and to convert a virtual address received from a processor into a physical address of a main memory using the cached PTEs. A page table walk request queue is configured to queue page table walk requests corresponding to a virtual page number included in the virtual address when of a TLB miss has occurred. One or more page table walkers (PTWs) are configured to acquire, based on virtual page numbers of the page table walk requests, a PTE from the main memory, and to convert the virtual page numbers into physical frame numbers using the PTE. A PTW selected from among the one or more PTWs is configured to select, from among the page table walk requests queued in the page table walk request queue, associated page table walk requests having the same base address of corresponding virtual page numbers, to consecutively provide, to the main memory, cache line requests for acquiring PTEs corresponding to the associated page table walk requests, to acquire, from cache lines acquired from the main memory, the PTEs corresponding to the associated PTE requests, and to provide the acquired PTEs to the TLB.

A memory management unit including a page table walker (PTW) is configured to acquire, based on a virtual page number of a page table walk request, a page table entry (PTE) from a main memory. A page table walk request queue is configured to queue a plurality of page table walk requests. The PTW is configured to determine, based on virtual page numbers of the page table walk requests queued in the page table walk request queue, associated page table walk requests, among the page table walk requests, in which a corresponding PTE is stored in the same memory cell row of the main memory, and to consecutively provide, to the main memory, access requests for processing the associated page table walk requests.

A method of walking a multi-level page table includes selecting one page table walk request from among a plurality of page table walk requests for finding a page table entry (PTE) corresponding to a virtual page number in a page table walk request queue. One or more associated page table walk requests are selected by searching the page table walk request queue, when an associated page table walk request having a base address that is the same as a base address of the selected page table walk request is queued in the page table walk request queue, at a current search level of the selected page table walk request. Cache lines in which the data is stored is specified, in a memory cell row of a main memory in which data corresponding to the selected page table walk request is stored. Requests for the cache lines to the main memory are consecutively provided. Requested cache lines are sequentially acquired from the main memory. The selected page table walk requests are processed at the current search level using the acquired cache lines, and PTEs corresponding to the processed page table walk requests are outputted, when the current search level of the processed page table walk requests is a last level.

BRIEF DESCRIPTION OF DRAWINGS

The above and other aspects and features of the present inventive concept will be more clearly understood from the following detailed description, taken in conjunction with the accompanying drawings, in which:

FIGS. 6A to 6E are diagrams illustrating a method of walking a page table according to an example embodiment of the present disclosure;

DETAILED DESCRIPTION

Hereinafter, example embodiments of the present disclosure will be described with reference to the accompanying drawings.

Figure 1A:
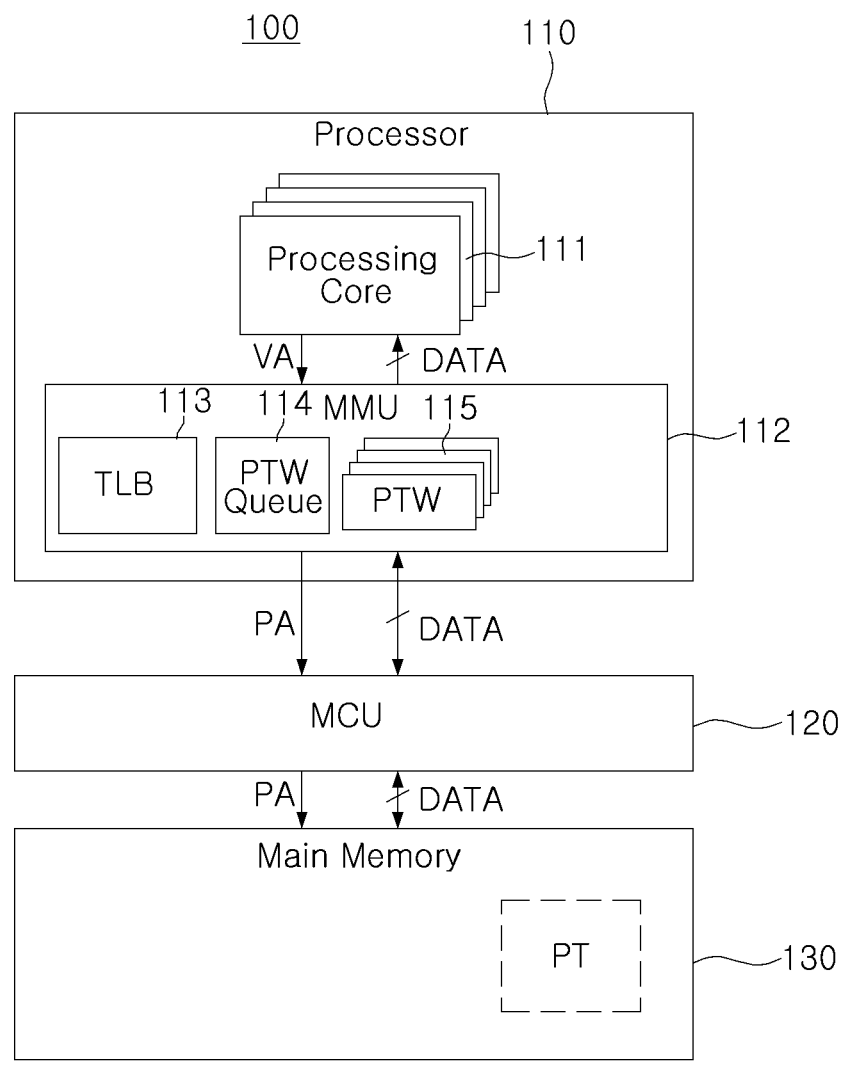
FIGS. 1A and 1B are diagrams illustrating a computing system according to an example embodiment of the present disclosure.
Figure 1B:
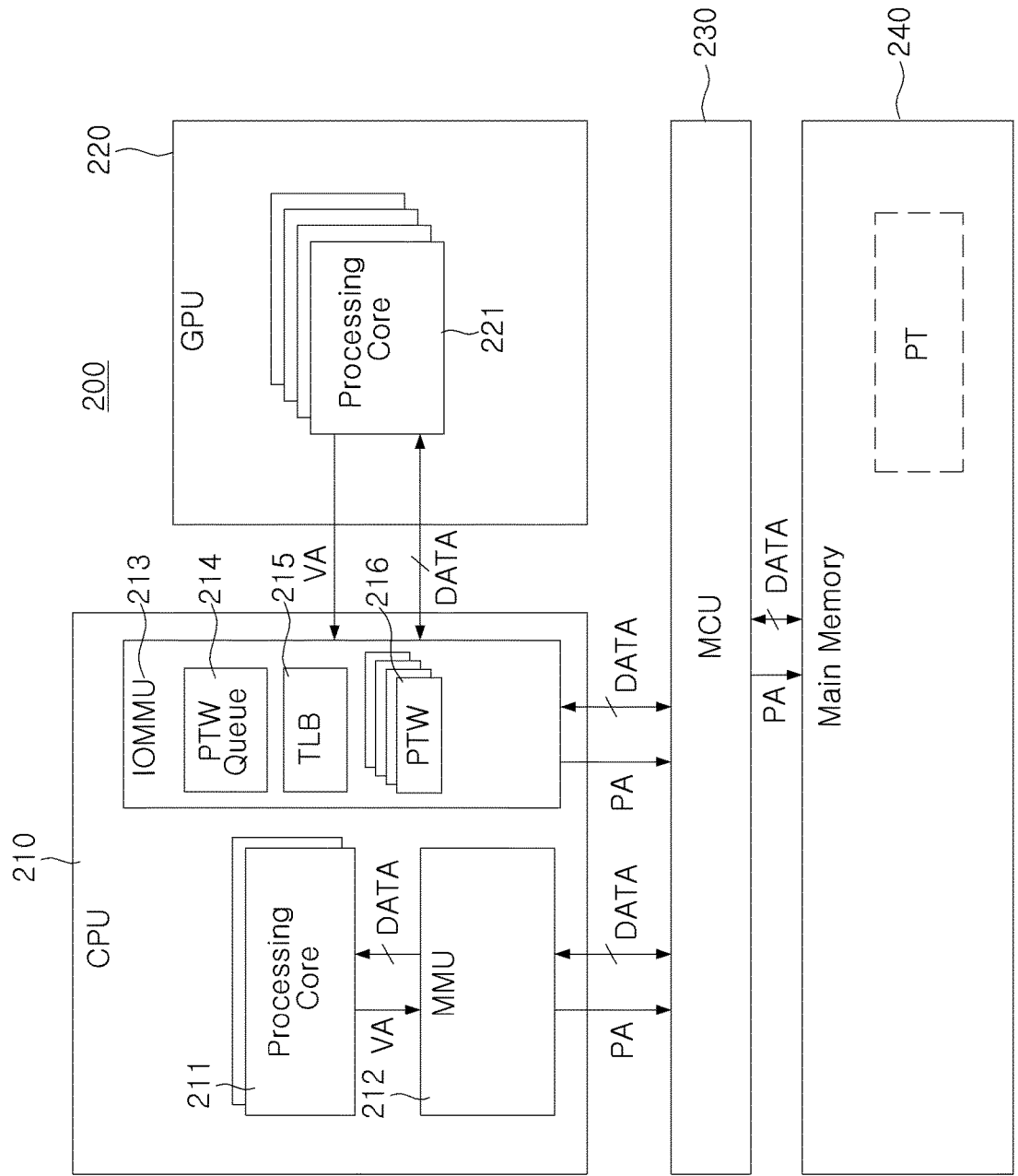

FIGS. 1A and 1B are diagrams illustrating a computing system according to an example embodiment of the present disclosure.

Referring to FIG. 1A, a computing system 100 may include a processor 110, a memory control unit (MCU) 120, and a main memory 130. The processor 110 may include a plurality of processing cores 111, each performing operation independently. The processor 110 may be, for example, a graphic processing unit (GPU) capable of performing massive parallel operations. However, the present disclosure is not necessarily limited thereto, and the processor 110 may also be a central processing unit (CPU), a neural processing unit (NPU), or the like.

The main memory 130 may store data and instructions to be used by the processor 110. For example, the main memory 130 may be dynamic random access memory (DRAM), double data rate synchronous DRAM (DDR SDRAM), nonvolatile RAM (NVRAM), or the like. The MCU 120 may control the main memory 130 and access the main memory 130 in response to a request from the processor 110. The MCU 120 may be embodied as a logic device such as an integrated circuit, specifically designed to perform the described functions by a combination of logic circuits, storage, and firmware.

The computing system 100 may be controlled by an operating system (OS). The OS may allocate a virtual memory for each of processes executed by the processor 110. Each of the plurality of processing cores 111 may acquire data from the main memory 130 to execute the processes. Each of the plurality of processing cores 111 may access the main memory 130, based on a virtual address indicating a region of the virtual memory.

The processor 110 may include a memory management unit (MMU) 112 to convert the virtual address (VA) into a physical address (PA) indicating a physical region of the main memory 130. The MMU 112 may refer to a page table PT to convert the virtual address to the physical address. The page table PT may include a plurality of page table entries (PTEs) indicating a physical address corresponding to a virtual address, and may be stored in the main memory 130. The MMU 112 may also be embodied as a logic device such as an integrated circuit, specifically designed to perform the described functions by a combination of logic circuits, storage, and firmware.

The MMU 112 may include a translation lookaside buffer (TLB) 113, a page table walk request queue 114, and one or more page table walkers (PTWs) 115. The TLB 113 may cache recently used PTEs such that a frequently accessed virtual address may be rapidly converted into a physical address.

When a request for a virtual address occurs, the MMU 112 may first search the TLB 113 to find a target PTE including a physical address corresponding to the virtual address. When the target PTE is cached in the TLB 113, for example, in the case of a TLB hit, the MMU 112 may convert the virtual address into a physical address using the target PTE. When the target PTE is not cached in the TLB 113, for example, in the case of a TLB miss, the MMU 112 may generate a page table walk request for searching the page table PT. The generated page table walk request may be queued in the page table walk request queue 114.

One or more PTWs 115 may perform, in response to the page table walk request queued in the page table walk request queue 114, a page table walk for searching the page table PT to acquire the target PTE.

In some cases, such as a case in which the processor 110 process massive parallel operations, each of the plurality of processing cores 111 may require address conversion for multiple virtual addresses. The TLB 113 might not have sufficient capacity to cache PTEs for all of the virtual addresses accessed by the plurality of processing cores 111. Accordingly, multiple page table walk requests may occur when the processor 110 performs massive parallel operations.

The speed at which the PTW 115 acquires the PTEs by referring to the page table PT of the main memory 130 may be slow compared to the processing speed of the processor, and the multiple page table walk requests may cause a bottleneck in the processor 110. To alleviate the bottleneck, the number of page table walk requests that may be processed in parallel may be increased by increasing the number of PTWs 115 included in the MMU 112. However, an increase in the number of PTWs 115 may cause an increase in circuit area and power consumption.

According to an example embodiment of the present disclosure, the PTW 115 of the MMU 112 may more rapidly process page table walk requests by consecutively processing associated page table walk requests, among page table walk requests queued in the page table walk request queue 114. For example, the associated page table walk requests may indicate page table walk requests for PTEs stored in the same memory cell row of the main memory 130. When the associated page table walk requests are consecutively processed, a row buffer hit rate of the main memory 130 may increase, allowing the page table walk requests to be rapidly processed. As a result, a bottleneck in the processor may be alleviated, and the processing time of the processor 110 may be reduced.

A PTW, according to an example embodiment of the present disclosure, may be included in a processor requiring massive parallel operations, but may also operate outside of the processor.

Referring to FIG. 1B, a computing system 200 may include a CPU 210, an auxiliary processor 220, an MCU 230, and a main memory 240. The CPU 210 may perform overall control on the computing system 200, and may include one or more processing cores 211, an MMU 212, and an input-output memory management unit (IOMMU) 213.

The MMU 212 may convert a virtual address allocated to the processing cores 211 into a physical address of the main memory 240. In addition, the IOMMU 213 may convert a virtual address allocated to an auxiliary device included in the computing system 200 into a physical address of the main memory 240. The IOMMU 213 may also be embodied as a logic device such as an integrated circuit, specifically designed to perform the described functions by a combination of logic circuits, storage, and firmware.

The auxiliary processor 220 may include a plurality of processing cores 221. The auxiliary processor 220 may be a processor capable of performing massive parallel operations, such as a GPU. The auxiliary processor 220 may access the main memory 240 via the IOMMU 213. For example, virtual addresses (VAs) accessed by the plurality of processing cores 221 of the auxiliary processor 220 may be converted into physical addresses (PAS) by the IOMMU 213.

The IOMMU 213 may include a page table walk request queue 214, a TLB 215, and a PTW 216. When the auxiliary processor 220 is tasked with performing massive parallel operations, multiple page table walk requests may occur in the IOMMU 213, and a bottleneck may occur for processing the multiple page table walk requests.

According to an example embodiment of the present disclosure, the PTW 216 of the IOMMU 213 may process page table walk requests for associated PTEs stored in the same memory cell row of the main memory 240 together, among page table walk requests queued in the page table walk request queue 214.

Hereinafter, both the MMU 112 of FIG. 1A and the IOMMU 213 of FIG. 1B may be referred to as an MMU. Before an MMU according to an example embodiment of the present disclosure is further described, a method of walking a page table and associated page table walk requests will be described in detail.

Figure 2:
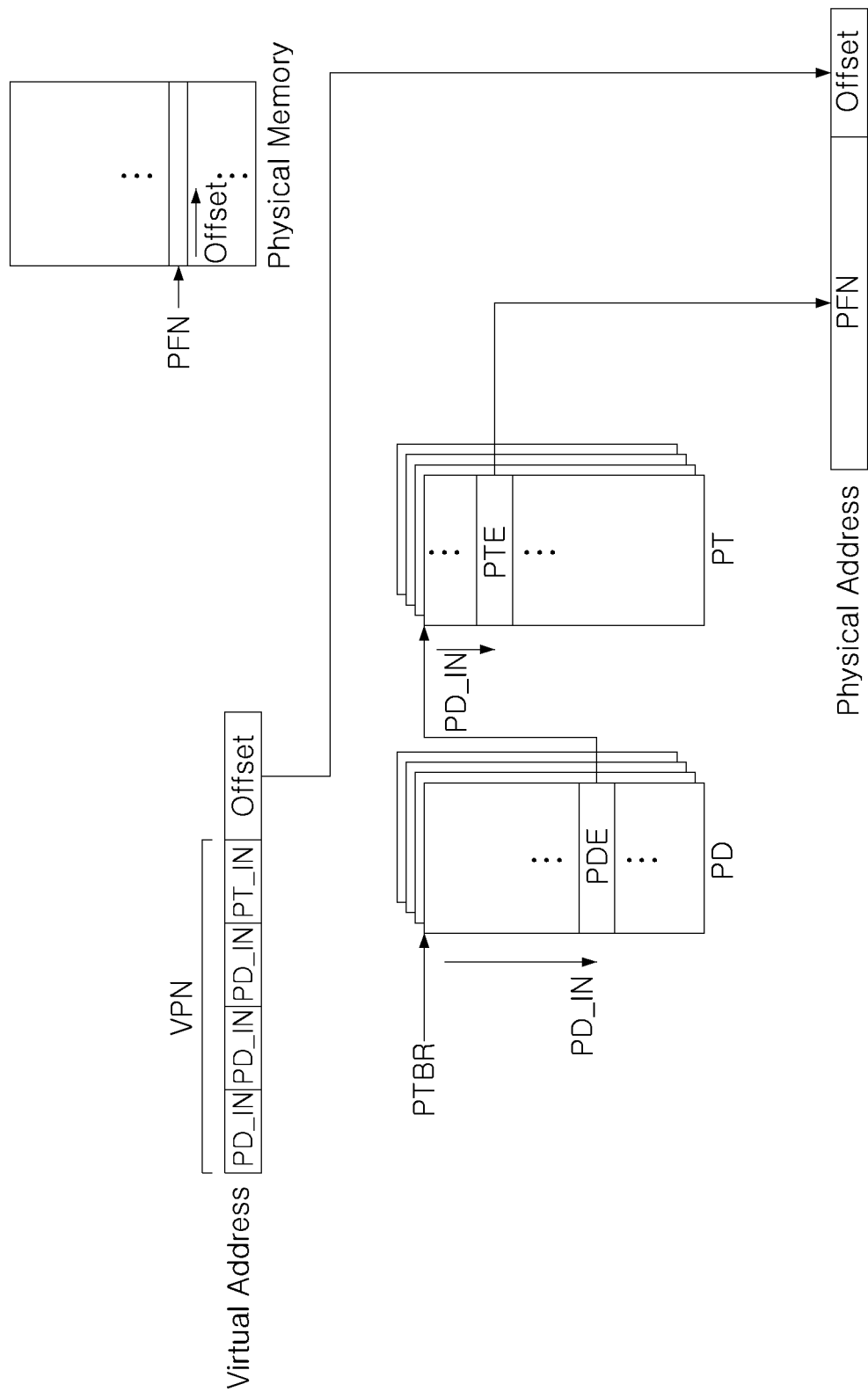
FIG. 2 is a diagram illustrating a method of walking a page table based on a multi-level page table.

FIG. 2 is a diagram illustrating a method of walking a page table based on a multi-level page table.

Referring to FIG. 2, a virtual address may include a virtual page number VPN and an offset. A physical address may include a physical frame number PFN and an offset.

A block of physical storage space in the main memory divided into regular-sized blocks may be referred to as a frame, and the physical frame number PFN may be an identifier of the frame. The offset may refer to bytes included in the frame. The virtual page number VPN may be mapped to the physical frame number PFN, and the offset of the virtual address may be the same as the offset of the physical address.

A PTW may convert a virtual address to a physical address by finding a target PTE storing the physical frame number PFN corresponding to the virtual page number VPN. A multi-level page table may be used such that the PTW finds the target PTE. For example, the multi-level page table may include a plurality of page tables PT, each including a plurality of PTEs. The PTW may first refer to a page directory PD to find a page table PT storing the target PTE.

For example, the PTW may search the page directory PD using high-order bits of the virtual page number VPN as a page directory index PD_IN. The page directory PD may be indicated by a page table base address PTBR. The PTW may find a page directory entry (PDE) indicating a position in which a page table including the target PTE is stored.

The PTW may search the page table PT using low-order bits of the virtual page number VPN as a page table index PT_IN. The page table PT to be searched may be indicated by the PDE. The PTW may find the target PTE by searching the page table PT. The target PTE may include a physical frame number PFN corresponding to a virtual page number VPN.

Multiple PTEs included in the multi-level page table may be stored in the main memory. Depending on a structure of the storage space in the main memory, some of the multiple PTEs may be rapidly accessed when consecutively accessed.

Figure 3:
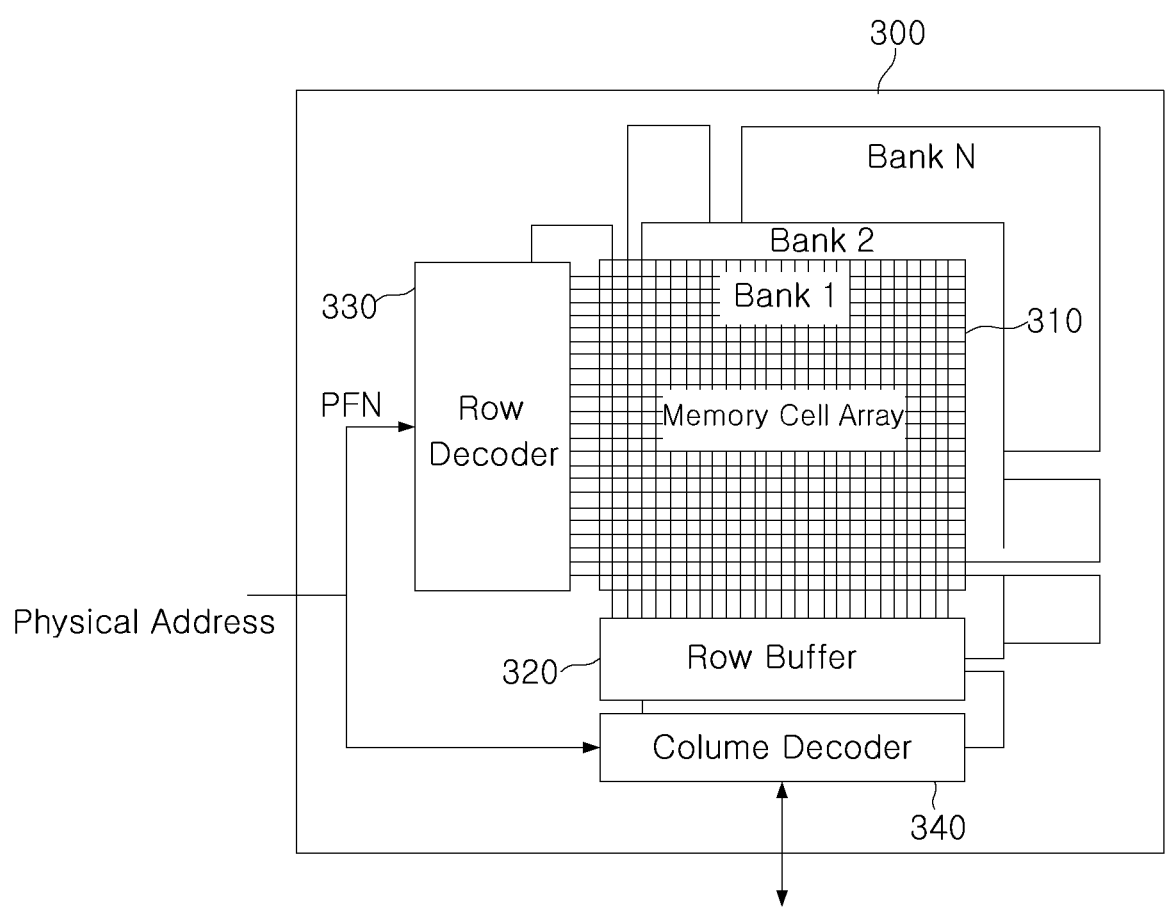
FIG. 3 is a diagram illustrating a main memory.

FIG. 3 is a diagram illustrating a main memory.

A main memory 300 of FIG. 3 may correspond to the main memory 130 of FIG. 1A and the main memory 240 of FIG. 1B. The main memory 300 may include a plurality of memory banks Bank1-BankN. Each of the memory banks Bank1-BankN may include a memory cell array and a peripheral circuit controlling the memory cell array. For example, a first bank Bank1 may include a memory cell array 310, a row buffer 320, a row decoder 330, and a column decoder 340.

The memory cell array 310 may include a plurality of memory cells connected to a plurality of bit lines and a plurality of word lines. When the main memory 300 is a volatile memory, such as a dynamic random access memory (DRAM), each of the plurality of memory cells may include a cell switch and a cell capacitor. The memory cell array 310 may be connected to a row decoder 330 via the word lines and may be connected to a row buffer 320 via the bit lines.

The row decoder 330 may select, in response to a row address among physical addresses, one of the plurality of word lines. The row decoder 330 may turn on the selected word line for a write operation and a read operation. The main memory 300 may be accessed by the row decoder 330 in units of memory cell rows. Depending on the implementation, the row address may correspond to a physical page number PFN.

The row buffer 320 may also be referred to as a sense amplifier, and may operate as a write driver or a sense amplifier depending on an operation mode thereof. For example, during the write operation, the row buffer 320 may apply, to the selected bit line, a bit line voltage corresponding to data to be written DATA. In addition, during the read operation, the row buffer 320 may sense data stored in the memory cell by amplifying the current or voltage of the selected bit line. The column decoder 340 may control the row buffer 320 in response to a column address among the physical addresses.

When the main memory 300 reads a row of memory cells from the memory cell array 310 to respond to an external request, data stored in the row may be buffered in the row buffer 320. The main memory 300 may maintain the data buffered in the row buffer 320 in consideration of spatial locality.

When a request for data is externally received, the main memory 300 may first search the row buffer 320 to acquire the requested data. When the requested data is buffered in the row buffer 320, for example, in the case of a row buffer hit, the main memory 300 may rapidly respond to the request without performing the read operation on the memory cell array 310. Conversely, when the requested data is not buffered in the row buffer 320, for example, in the case of a row buffer miss, the main memory 300 may perform the read operation on the memory cell array 310.

A storage capacity provided by a one memory cell row may be greater than a storage capacity occupied by one PTE. For example, hundreds of PTEs may be stored in the one memory cell row. When a target PTE for any page table walk request is requested to the main memory 300, the main memory 300 may buffer multiple PTEs, including the target PTE, in the row buffer 320.

According to an example embodiment of the present disclosure, the MMU may consecutively process page table walk requests for associated PTEs, stored in the same memory cell row, among a plurality of page table walk requests to be processed. When the page table walk requests for the associated PTEs are processed consecutively, a row buffer hit rate of the main memory 300 may be increased, thereby rapidly processing the plurality of page table walk requests.

Figure 4:
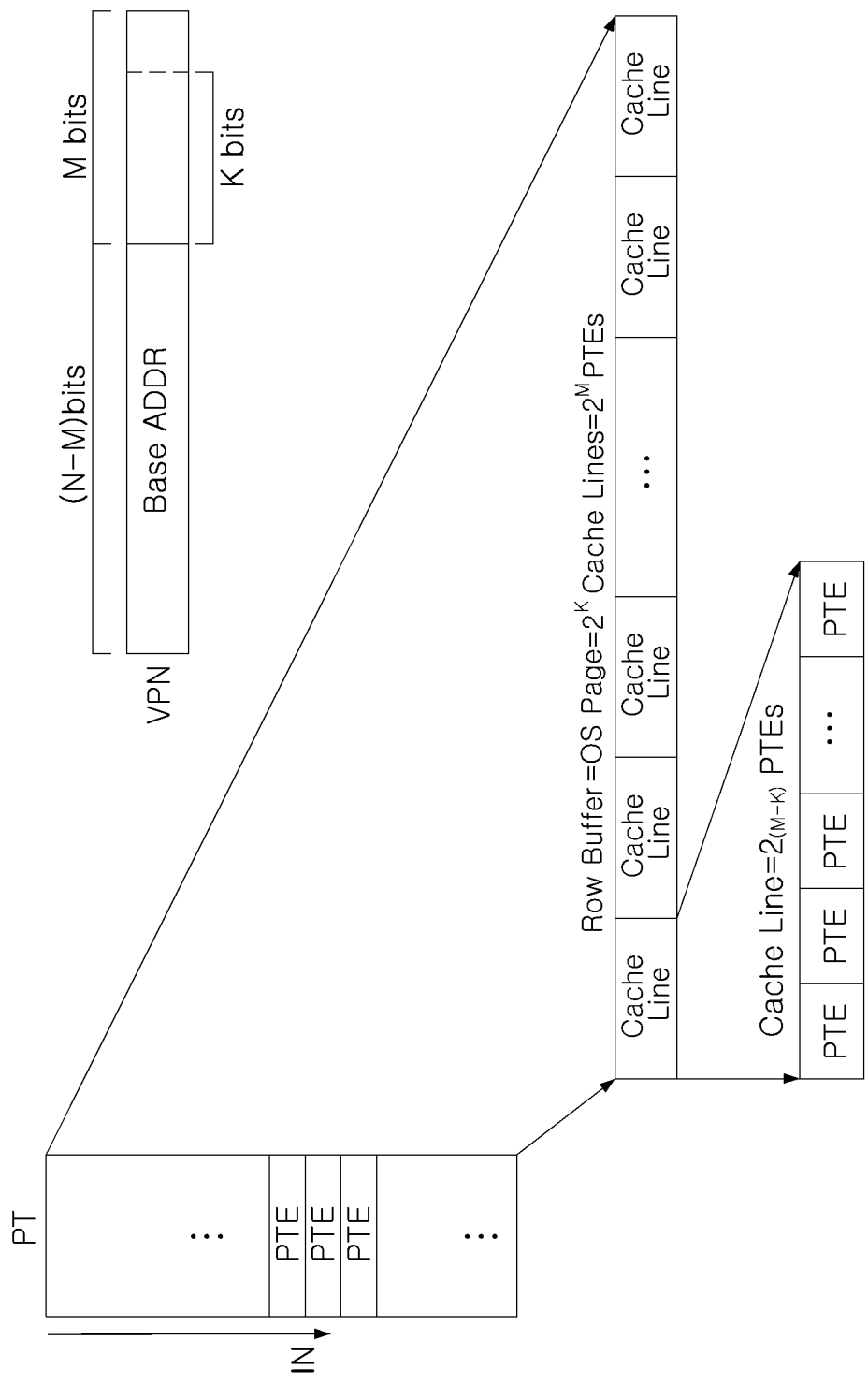
FIG. 4 is a diagram illustrating an associated page table entry (PTE) stored in the same row buffer in a main memory.

FIG. 4 is a diagram illustrating an associated PTE stored in the same row buffer in a main memory.

FIG. 4 illustrates one page table PT, among page tables that may be stored in a main memory, a row buffer, and a cache line.

The page table PT may include a plurality of PTEs for consecutive virtual page numbers. As described with reference to FIG. 2, a position in which a target PTE to be acquired using a page table walk request is stored may be specified by a page table index PT_IN. An MMU may request the target PTE from the main memory using the page table index PT_IN.

In response to a request from the MMU, the main memory may buffer not only the target PTE but also all data of a memory cell row, including the target PTE, in a row buffer.

Depending on the implementation, a size of the memory cell row and a size of the row buffer may be the same as a size of a virtual page (OS Page) defined in an OS. For example, both the size of the row buffer and the size of the virtual page may be 4 KB. The virtual page may be allocated to one virtual page number VPN, and the virtual page may provide a consecutive memory space of 4 KB.

The MMU may store one page table PT in one virtual page, which is a consecutive memory space, such that the page table PT may be searched using an index. As a result, a plurality of PTEs for consecutive virtual addresses may be stored in the memory cell row. For example, when a size of one PTE is 8 bytes and a size of a row buffer is 4 KB, 512 PTEs may be buffered in one row buffer. In the example of FIG. 4, $2^M$ PTEs may be buffered in one row buffer (where M is a positive integer).

Virtual addresses corresponding to the plurality of PTEs, stored in one memory cell row, may include a common address. For example, when the virtual page number VPN consist of a total of N bits (where N is a positive integer), consecutive virtual addresses corresponding to $2^M$ PTEs that may be buffered in one row buffer may have a high-order (N–M)-bit common address, and may have a low-order M-bit individual address.

Whether PTEs corresponding to different virtual page numbers VPN are stored in one memory cell row may be determined depending on whether high-order (N–M)-bit addresses of the virtual page numbers VPN are the same. Hereinafter, the high-order (N–M)-bit addresses may be referred to as a base address.

The MMU may acquire data buffered in the row buffer in units of cache lines. A cache line may refer to a minimum unit in which a processor acquires data from a main memory. The MMU may acquire a cache line, including the PTE, among the buffered data, and may access the main memory using the PTE included in the cache line. For example, when a size of one cache line is 64 bytes, eight PTEs for consecutive virtual addresses may be included in the one cache line. In addition, the row buffer may include 64 cache lines. In the example of FIG. 4, a case in which the row buffer includes $2^K$ cache lines (where K is a positive integer) and one cache line includes $2^{(M-K)}$ PTEs is exemplified. High-order K bits among low-order M bits of a virtual address may specify a cache line in which a PTE corresponding to the virtual address is stored.

According to an example embodiment of the present disclosure, the MMU may find, based on virtual addresses of page table walk requests to be processed, associated page table walk requests for PTEs, stored in the same memory cell row, among the page table walk requests. In addition, the MMU may rapidly process the page table walk requests by consecutively processing the associated page table walk requests.

Figure 5:
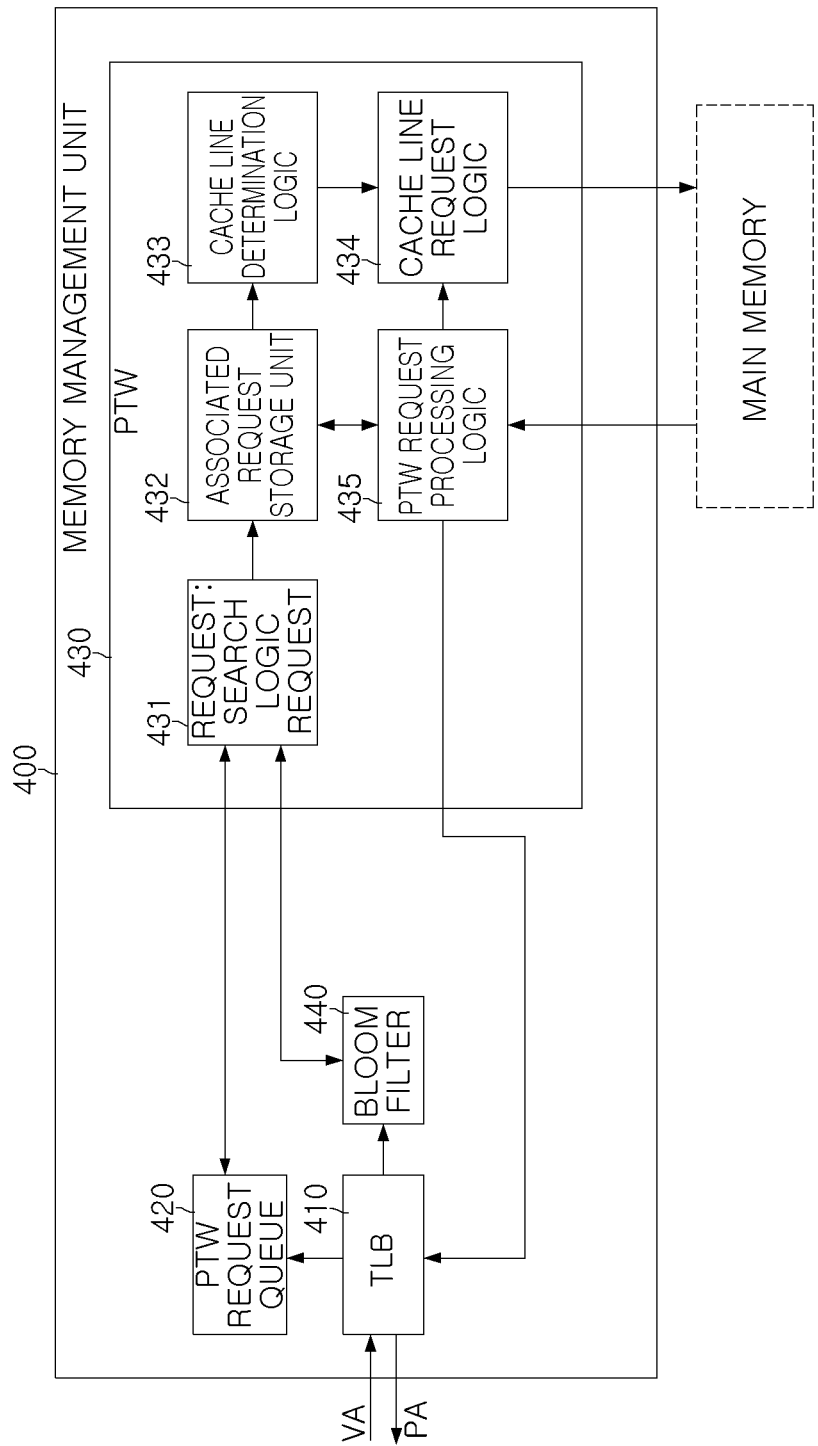
FIG. 5 is a diagram illustrating a memory management unit according to an example embodiment of the present disclosure.

FIG. 5 is a diagram illustrating an MMU according to an example embodiment of the present disclosure.

An MMU 400 of FIG. 5 may correspond to the MMU 112 described with reference to FIG. 1A and the IOMMU 213 described with reference to FIG. 1B.

Referring to FIG. 5, the MMU 400 may include a TLB 410, a page table walk request queue 420, a PTW 430, and a bloom filter 440. It is to be understood that when it is said that a logic device, such as an MMU, "includes" an element, such as a queue or a filter, this means that the logic device includes circuitry, memory, firmware, etc., for performing the operations of the element, as described herein and as understood by one of ordinary skill in the art. Moreover, all logic devices defined herein as logic devices or known in the art to be logic devices, are understood to be embodied as integrated circuits including circuitry, memory, firmware, etc. for performing the functions discussed herein as well as other functions known by one of ordinary skill in the art as being performed by such a device.

The TLB 410 may cache recently referenced PTEs. When a virtual address VA is received from a processing core to the MMU 400, it may be first searched whether a PTE corresponding to a virtual page number included in the received virtual address VA is cached in the TLB 410. In the case of a TLB miss in which the PTE is not cached in the TLB 410, the MMU 400 may generate a page table walk request for finding the PTE from a page table, and may queue the generated page table walk request in the page table walk request queue 420.

The PTW 430 may find a target PTE to be found by performing a page table walk in response to the page table walk request queued in the page table walk request queue 420. The target PTE found by the PTW 430 may be cached in the TLB 410, and may be used to convert a virtual address into a physical address. The MMU 400 may include a plurality of PTWs capable of performing page table walks in parallel. FIG. 5 illustrates one PTW 430 as a simplified example.

The PTW 430 may include a search logic 431, an associated request storage unit 432, a cache line determination logic 433, a cache line request logic 434, and a page table walk request processing logic 435.

The search logic 431 may select, from the page table walk request queue 420, one of the page table walk requests for which processing has not started yet. In addition, the search logic 431 may select one or more associated page table walk requests associated with the selected page table walk request from among page table walk requests for which processing has not started yet.

page table walk requests being associated to each other may mean that target PTEs to be found in the associated page table walk requests are associated PTEs stored in the same memory cell row of a main memory.

As described with reference to FIG. 4, virtual addresses corresponding to associated PTEs may have the same base address. When base addresses of virtual addresses corresponding to page table walk requests match each other, the search logic 431 may determine the page table walk requests as associated page table walk requests.

The associated request storage unit 432 may store associated page table walk requests selected from the page table walk request queue 420. The PTW 430 may process the associated page table walk requests, stored in the associated request storage unit 432, together.

The cache line determination logic 433 may determine the ordinal of a cache line of a row buffer from which each of PTEs corresponding to the associated page table walk requests, stored in the associated request store 432, needs to be acquired. As described with reference to FIG. 4, a cache line from which PTEs are to be acquired may be determined from a predetermined-digit number of bits of a virtual page number corresponding to the PTEs.

The cache line request logic 434 may consecutively provide requests for the cache lines determined by the cache line determination logic 433 to the main memory to acquire the cache lines.

The main memory may buffer, in response to a first request among the consecutive requests, data corresponding to a selected memory cell row in a row buffer, and may provide, to an MMU, data corresponding to a requested cache line among pieces of the buffered data. However, with respect to requests subsequent to the first request, a row buffer hit may occur, such that data corresponding to another cache line, among pieces of data buffered in the row buffer, may be provided to the MMU. With respect to the requests subsequent to the first request, an operation of reading, by the main memory, data from a memory cell array and buffering the data in the row buffer may be omitted, such that PTEs corresponding to the associated page table walk requests may be rapidly acquired.

The page table walk request processing logic 435 may find target PTEs to be found by each of the associated page table walk requests from cache lines acquired from the main memory and may provide the target PTEs to the TLB 410. The page table walk request processing logic 435 may operate until all associated page table walk requests stored in the associated request storage 432 are processed.

Whenever the search logic 431 selects a page table walk request, searching the page table walk request queue 420 to find associated page table walk requests to be processed together may result in high power consumption. According to an example embodiment of the present disclosure, the search logic 431 may use the bloom filter 440 to determine whether associated page table walk requests associated with the selected page table walk request are queued in the page table walk request queue 420, before searching the page table walk request queue 420.

Whenever a page table walk request are inserted into the page table walk request queue 420, the MMU 400 may insert, into the bloom filter 440, a base address, among virtual addresses, corresponding to the page table walk request. The search logic 431 may input the base address corresponding to the selected page table walk request to the bloom filter 440, thereby determining whether another page table walk request having a common base address is queued in the page table walk request queue 420.

The MMU 400 may delete, from the bloom filter 440, a base address corresponding to a page table walk request removed from the page table walk request queue 420. The bloom filter 440 may be implemented as a bloom filter, such as a counting bloom filter allowing for deletion of an inserted value.

Hereinafter, a specific example of a method of walking a page table, performed by the PTW 430, will be described with reference to FIGS. 6A to 6E, and an operation of the bloom filter 440 will be described in detail with reference to FIG. 7.

FIGS. 6A to 6E are diagrams illustrating a method of walking a page table according to an example embodiment of the present disclosure.

FIG. 6A illustrates a page table walk request queue and a PTW status table. The page table walk request queue may correspond to the page table walk request queue 420 described with reference to FIG. 5. The PTW status table may be managed by the MMU 400 described with reference to FIG. 5, and may include status information on each of one or more PTWs that may be included in the MMU 400.

In FIG. 6A, a plurality of page table walk requests may be queued in the page table walk request queue. The page table walk request queue may display virtual page numbers VPN corresponding to the page table walk requests and whether the page table walk requests are being processed by a PTW. In FIG. 6A, all N-bit addresses of the virtual page numbers VPN corresponding to the page table walk requests, for example, low-order 10-bit addresses, among 36-bit addresses, are illustrated.

PTWs may be in an idle status rather than being in a busy status. One PTW selected from among the PTWs in an idle status may select a request, queued at the head of the page table walk request queue, from among page table walk requests queued in the page table walk request queue. In FIG. 6A, a status of a PTW performing a page table walk request may be updated to a busy status.

Referring to FIG. 6B, a PTW may select one of page table walk requests queued in a page table walk request queue. For example, when the page table walk request queue has a first-in first-out (FIFO) structure, a page table walk request queued at the head of the page table walk request queue may be selected. The PTW may search the page table walk request queue to find an associated page table walk request associated with the selected page table walk request. The PTW may find, based on base addresses of the page table walk requests queued in the page table walk request queue, the associated page table walk request. In an example in which $2^M$ PTEs are stored in one row buffer, high-order (N−M) bits of a virtual address may be determined as a base address.

For example, when a size of a row buffer is 4 KB and a size of one PTE is 8 bytes, high-order 27-bit addresses excluding low-order 9-bits addresses, among 36-bit addresses of a virtual page number VPN, may be base addresses. In the page table walk request queue of FIG. 6B, page table walk requests having a base address that is the same as that of the selected page table walk request are exemplified. The PTW may select the page table walk requests having the same base address as associated page table walk requests, and may process the associated page table walk requests together.

Associated page table walk requests for which processing is started by a PTW may be marked with a start status. The page table walk requests marked with the start status may be excluded from search targets, when another PTW search the page table walk request queue.

Figure 6C:
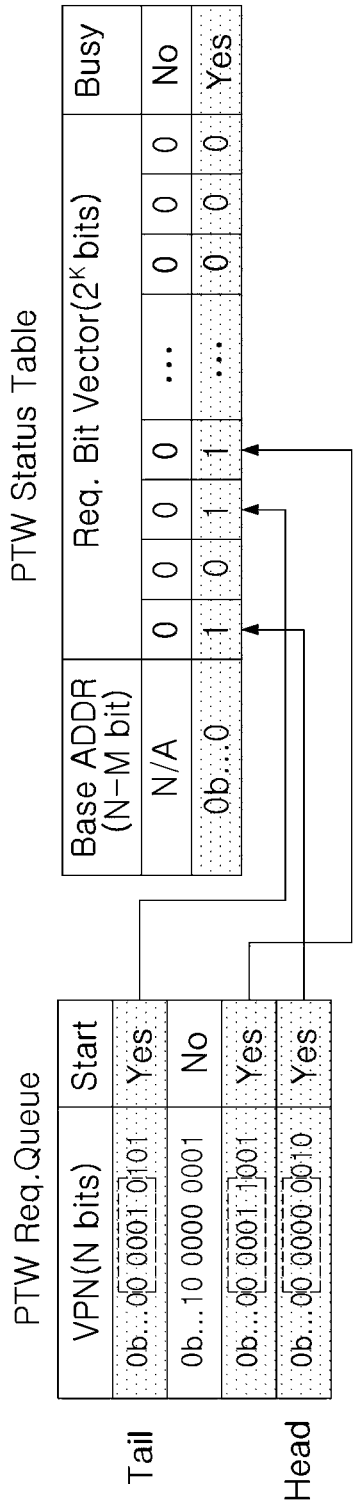

Referring to FIG. 6C, a PTW may determine, with reference to virtual page numbers of associated page table walk requests, the ordinals of cache lines of a row buffer corresponding to the associated page table walk requests. In addition, the PTW may update a bit vector indicating the ordinals of cache lines to be requested in a status table of the PTW.

In an example in which the row buffer includes $2^K$ cache lines, high-order K bits, among low-order M bits of a virtual page number, may determine a cache line from which a PTE corresponding to the virtual page number is to be acquired. For example, in an example in which the row buffer includes 64 cache lines, high-order 6-bit addresses, among low-order 9-bit addresses, may specify a cache line.

In FIG. 6C, a page table walk request queue may display bits indicating a cache line in and a bit vector indicating a cache line corresponding to the bits in a PTW status table.

Figure 6D:
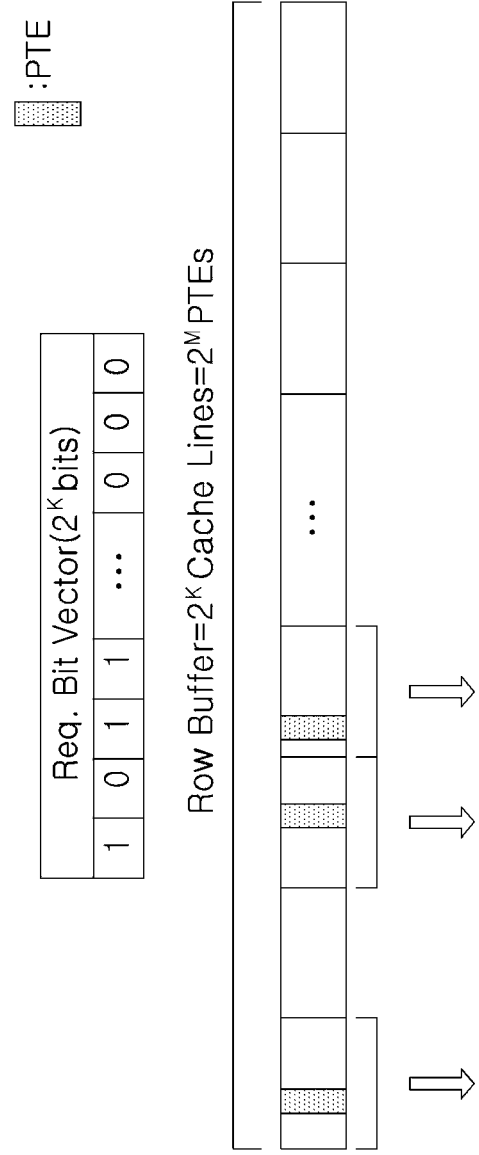

Referring to FIG. 6D, a PTW may consecutively request, based on the bit vector, cache lines from a main memory.

The main memory may first buffer, in response to a first request among consecutive cache line requests, data including target PTEs of the associated page table walk requests in a row buffer. In addition, the main memory may consecutively output, in response to the consecutive requests, the cache lines from the PTW.

Referring to FIG. 6E, processed requests may be removed from a page table walk request queue, and a status of a PTW having a completed operation in a PTW status table may be updated to an idle status.

Figure 7:
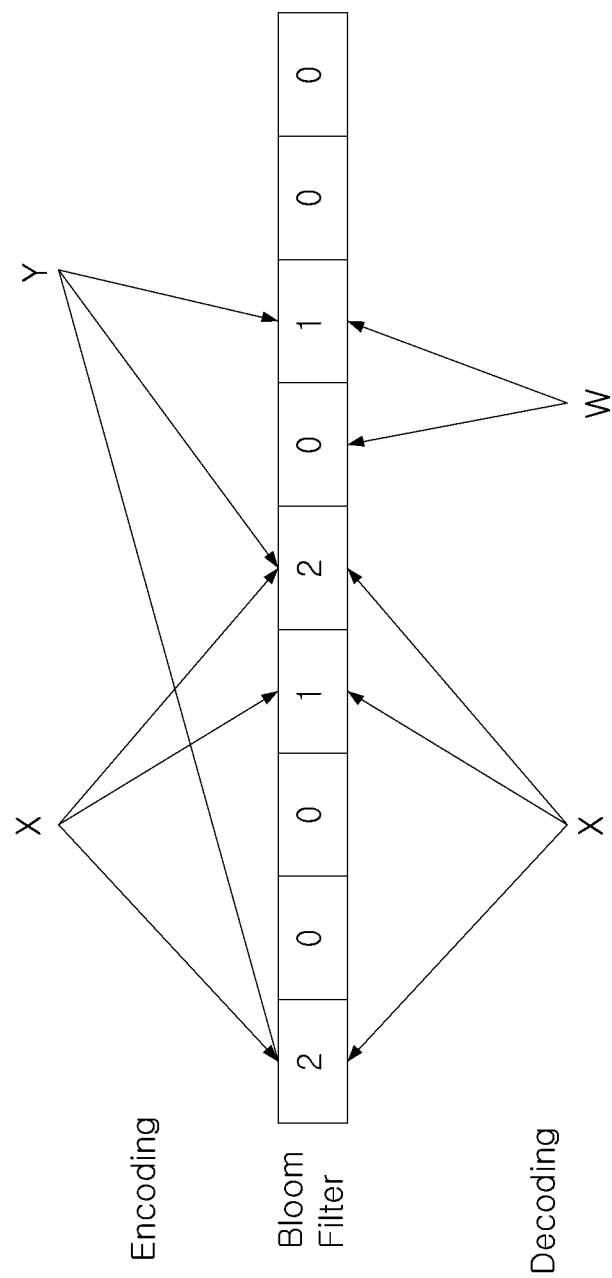
FIG. 7 is a diagram illustrating a method of operating a bloom filter.

FIG. 7 is a diagram illustrating a method of operating a bloom filter.

FIG. 7 illustrates a bloom filter including a plurality of counters. The bloom filter of FIG. 7 may correspond to the bloom filter 440 described with reference to FIG. 5.

The bloom filter may be a filter that may determine whether an element is included in a set. According to an example embodiment of the present disclosure, the bloom filter may determine whether there is a page table walk request associated with a selected page table walk request, among page table walk requests queued in a page table walk request queue.

The bloom filter may be encoded by updating counters indicated by a plurality of hash function operation values for input values (X, Y), among a plurality of counters included in the bloom filter. In addition, the bloom filter may be decoded by verifying values of counters indicated by a plurality of hash function operation values for a value to be checked. When all of the verified counter values are not "0" (X), it may be determined that the value to be checked is included in values input to the bloom filter. Conversely, when even one of the checked counters has a value of "0" (W), it may be determined that the value to be checked is not included in the values input to the bloom filter.

For example, when a page table walk request is queued in a page table walk request queue, an MMU may increase counter values indicated by hash function operation values for a base address of a virtual page number corresponding to the page table walk request. Conversely, when the page table walk request is removed from the page table walk request queue, the MMU may decrease the counter values indicated by the hash function operation values for the base address of the virtual page number corresponding to the page table walk request.

A PTW may select a page table walk request from the page table walk request queue, and may determine, based on whether all counter values indicated by the hash function operation values for the base address of the selected page table walk request are not "0," whether there is an associated page table walk request.

According to an example embodiment of the present disclosure, the PTW may find, based on virtual addresses of page table walk requests to be processed, associated page table walk requests having a corresponding PTE stored in the same memory cell row. The PTW may consecutively process the associated page table walk requests, thereby increasing a row buffer hit rate in a main memory, and rapidly processing the page table walk requests. In addition, the MMU may reduce power consumption required for the PTW to find the associated page table walk requests and further increase speed at which the page table walk requests are processed, using the bloom filter.

In FIGS. 2 to 7, a case in which associated page table walk requests are determined based on a PTE is described as an example, but the present disclosure is not necessarily limited thereto. For example, in a multi-level page table, a page directory may consist of multiple levels. When the multi-level page table includes a plurality of page directories, the associated page table walk requests may be determined based on a PDE in the present disclosure. Hereinafter, a method of walking a page table according to an example embodiment of the present disclosure will be described in detail with reference to FIGS. 8 to 11.

Figure 8:
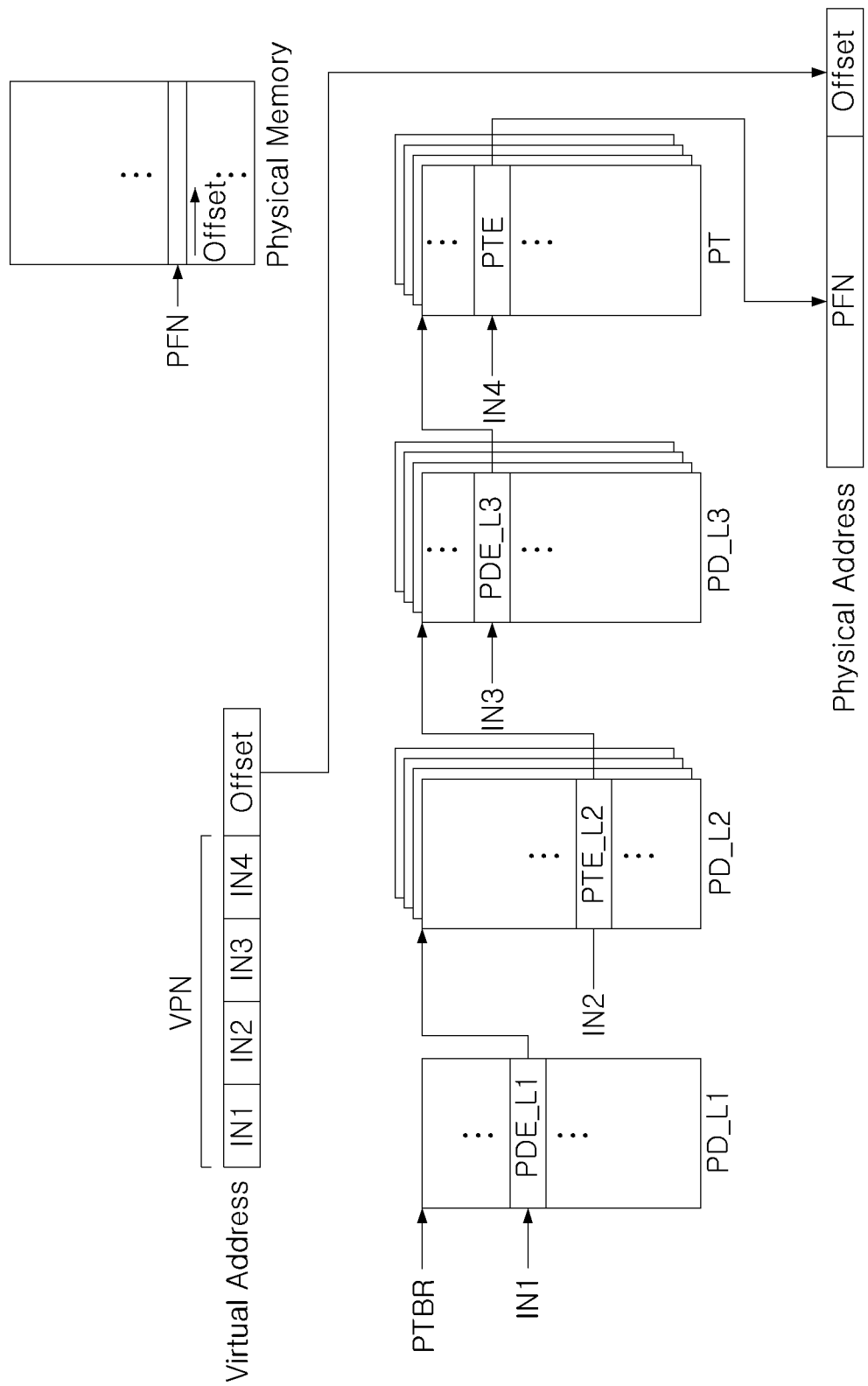
FIG. 8 is a diagram illustrating a method of walking a page table based on a multi-level page table walk.

FIG. 8 is a diagram illustrating a method of walking a page table based on a multi-level page table walk.

In the multi-level page table of FIG. 8, unlike the multi-level page table described with reference to FIG. 2, a page directory may be configured as a multi-level page directory. For example, a multi-level page table may include first to third level page directories PD_L1 to PD_L3 and a page table PT.

Even when the multi-level page table includes the multi-level page directory, the PTW may search the first to third level page directories PD_L1 to PD_L3 and the page table PT using address bits of a virtual page number VPN as an index. For example, the address bits of the virtual page number VPN may be used as first to fourth indexes IN1 to IN4 in order from high-order bits to low-order bits.

The PTW may find a first level PDE PDE_L1 by searching the first level page directory PD_L1, indicated by a page table base address PTBR, using the first index IN1. The PTW may find a second level PDE PDE_L2 by searching a second level page directory PD_L2, indicated by the first level PDE PDE_L1, using the second index IN2. Similarly, the PTW may find a third level PDE PDE_L3 by searching the third level page directory PD_L3, indicated by the second level PDE PDE_L2, using the third index IN3. The PTW may find a target PTE by searching the page table PT, indicated by the third level PDE PDE_L3, using the fourth index IN4. For example, the PTW may perform first to fourth level searches to find the target PTE in the multi-level page table.

In the example of FIG. 8, a plurality of second and third level page directories PD_L2 and PD_L3 may be included in the multi-level page table. As in the case of the page table PT, one page directory may also be stored in one memory cell row. Among the plurality of PDEs PDE_L2 and PDE_L3, PDEs included in the same page directory may be rapidly accessed, when consecutively accessed.

According to an example embodiment of the present disclosure, the PTW may find associated PDEs or associated PTEs whenever each level search is performed, cache line requests for the associated PDEs or cache line requests for the associated PTEs may be consecutively performed. The number of digits of a base address for finding the associated PDEs or associated PTEs may vary according to a search level of a PTW.

Figure 9A:
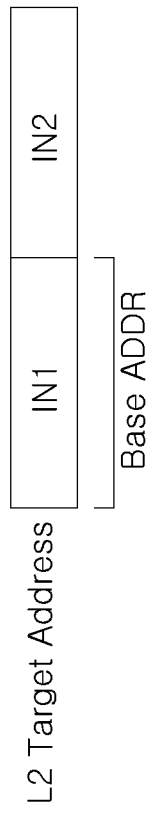
FIGS. 9A to 9C are diagrams illustrating a base address according to an example embodiment of the present disclosure.
Figure 9B:
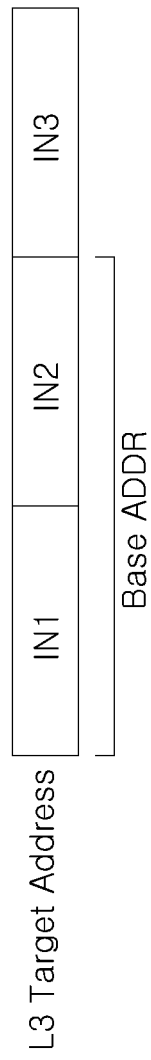
Figure 9C:
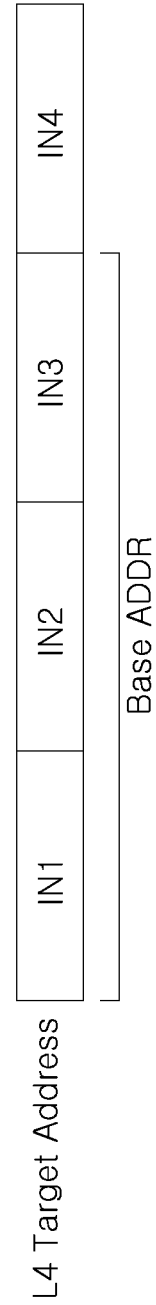

FIGS. 9A to 9C are diagrams illustrating a base address according to an example embodiment of the present disclosure.

FIG. 9A is a diagram illustrating a base address in a second level search for searching a second level page directory PD_L2. In the second level search for processing a page table walk request, only first and second indexes IN1 and IN2 which are high-order indexes of a virtual page numbers VPN corresponding to the page table walk request, may be considered. The first and second indexes IN1 and IN2 may be referred to as target addresses in the second level search.

When the second level search is performed, second level PDEs PDE_L2, corresponding to target addresses having the same first index IN1, may be stored in the same second level page directory PD_L2. For example, the second level PDEs PDE_L2, corresponding to the target addresses having the same first index IN1, may be stored in the same memory cell row of a main memory. According to an example embodiment of the present disclosure, when the second level search is performed, a PTW may determine the first index IN1 as a base address, and may consecutively acquire the second level PDEs PDE_L2 having the same base address.

FIG. 9B is a diagram illustrating a base address in a third level search for searching a third level page directory PD_L3. In the third level search, first to third indexes IN1 to IN3 of a virtual address corresponding to a page table walk request, may be referred to as target addresses.

When the third level search is performed, third level PDEs PDE_L3, corresponding to target addresses having the same first and second indexes IN1 and IN2, may be stored in the same third level page directory PD_L3. According to an example embodiment of the present disclosure, in the third level search, the first and second indexes IN1 and IN2 may be determined as base addresses, and the third level PDEs PDE_L3 having the same base address may be consecutively acquired.

FIG. 9C is a diagram illustrating a base address in a fourth level search for searching a page table PT. In the fourth level search, first to fourth indexes IN1 to IN4 may be referred to as target addresses.

When the fourth level search is performed, PTEs, corresponding to target addresses having the same first to third indexes IN1 to IN3, may be stored in the same page table PT. According to an example embodiment of the present disclosure, in the fourth level search, the first to third indexes IN1 to IN3 may be determined as base addresses, and PTEs having the same base address may be consecutively acquired.

At each search level, an address indicating a page directory including a PDE to be searched or a page table including a PTE to be searched may be determined as a base address.

Figure 10:
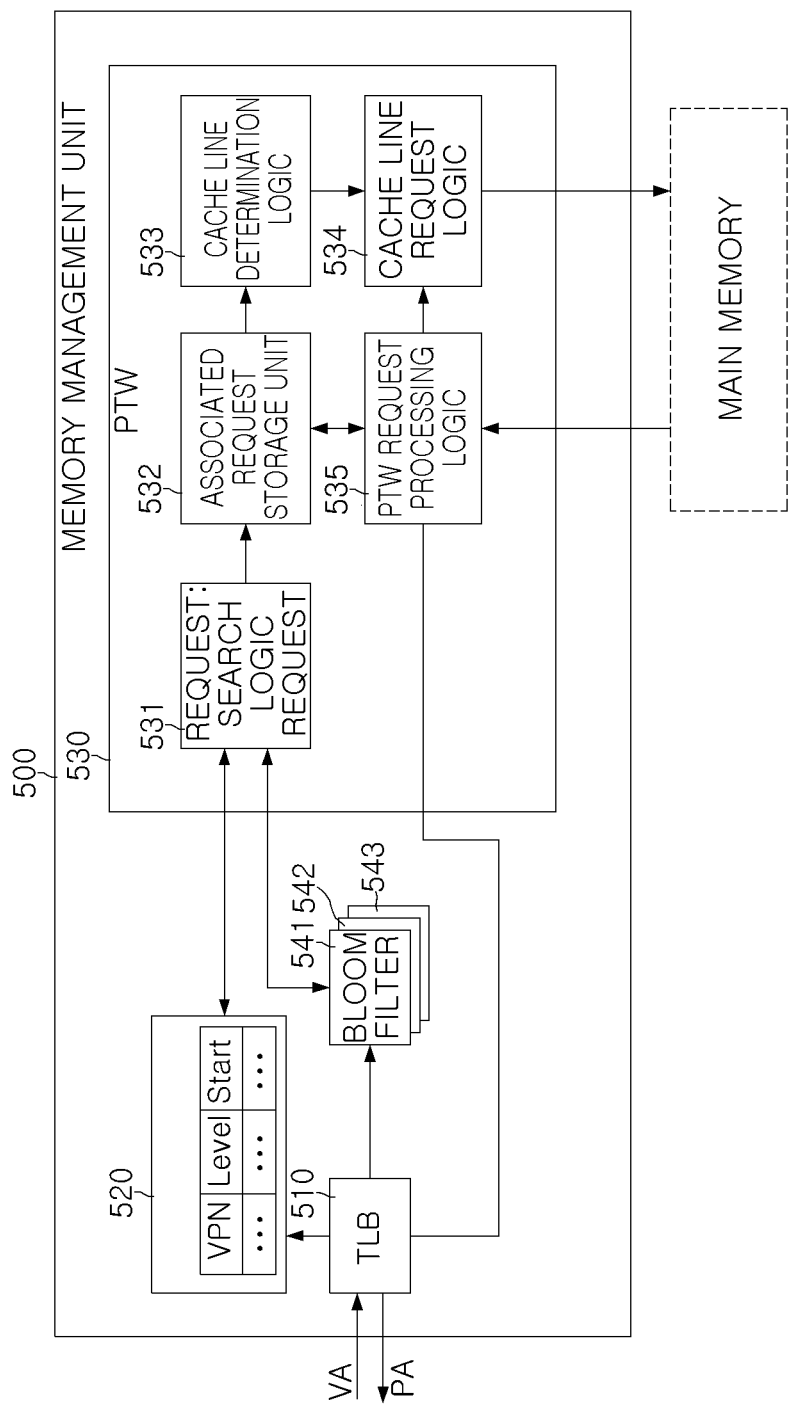
FIG. 10 is a diagram illustrating a memory management unit according to an example embodiment of the present disclosure.

FIG. 10 is a diagram illustrating an MMU according to an example embodiment of the present disclosure.

The MMU 500 of FIG. 10 may include a TLB 510, a page table walk request queue 520, a PTW 530, and a plurality of bloom filters 541, 542, and 543. The MMU 500 of FIG. 10 may have a configuration similar to that of the MMU 400 described with reference to FIG. 5. Hereinafter, the MMU 500 of FIG. 10 will be described mainly based on differences from the MMU 400 of FIG. 5. To the extent that an element in this figure has not been described in detail, it may be understood that the element is at least similar to a corresponding element that is described herein with reference to a different figure.

The page table walk request queue 520 of the MMU 500 may queue page table walk requests. The page table walk request queue 520 may further store a search level of a page table walk request as well as a virtual page number VPN corresponding to the page table walk request, and whether the page table walk request is started.

The PTW 530 may include a search logic 531, an associated request storage unit 532, a cache line determination logic 533, a cache line request logic 534, and a page table walk request processing logic 535.

The search logic 531 may select a page table walk request from the page table walk request queue 520, and may find, based on a current search level of the selected page table walk request, an associated page table walk request. As described with reference to FIGS. 9A to 9C, a base address may be determined depending on the search level of the page table walk request. The search logic 531 may have a search level the same as that of the page table walk request selected from the page table walk request queue 520, and may select page table walk requests having the same base address as associated page table walk requests.

The search logic 531 may use the plurality of bloom filters 541, 542, and 543 to determine whether a page table walk request associated with the selected page table walk request is queued in the page table walk request queue 520. The plurality of bloom filters 541, 542, and 543 may be selected depending on the search level of the selected page table walk request.

For example, when the PTW 530 performs a fourth level search, base addresses in second to fourth level searches may be different from each other. When a page table walk request is queued in the page table walk request queue 520, the base addresses in the second to fourth level searches may be determined based on a virtual page number VPN of the page table walk request, and may be inserted into the plurality of bloom filters 541, 542, and 543, respectively.

The associated request storage unit 532 may store associated page table walk requests. The PTW 530 may process current level searches of associated page table walk requests together.

The cache line determination logic 533 may determine the ordinal of a cache line of a row buffer from which each of PTEs, corresponding to the associated page table walk requests, or PDEs needs to be acquired. In addition, in order to acquire cache lines determined by the cache line determination logic 533, the cache line request logic 534 may consecutively provide requests for the cache lines to a main memory.

The page table walk request processing logic 535 may find target PDEs or target PTEs from cache lines acquired from the main memory. The target PTEs may be provided to the TLB 510, and the target PDEs may be used to perform a next level search on the associated page table walk requests.

According to an example embodiment of the present disclosure, when a multi-level page table has a multi-level page directory, the PTW 530 may consecutively process cache line requests for not only associated PTEs but also associated PDEs, such that the PDEs may be rapidly acquired from the main memory.

Depending on the implementation, when a page table walk request, selected by the PTW 530, is processed, the MMU 500 may selectively inactivate the search logic 531 for finding an associated page table walk request, and may individually process page table walk requests. As a first example, when the MMU 500 is the IOMMU 213 as described with reference to FIG. 1B, depending on a type of auxiliary processor electrically connected to the IOMMU 213, the IOMMU 213 may inactivate the function when the auxiliary processor does not require massive parallel processing. As a second example, the MMU 500 may selectively activate the function depending on a workload pattern in which a virtual address is accessed.

Figure 11:
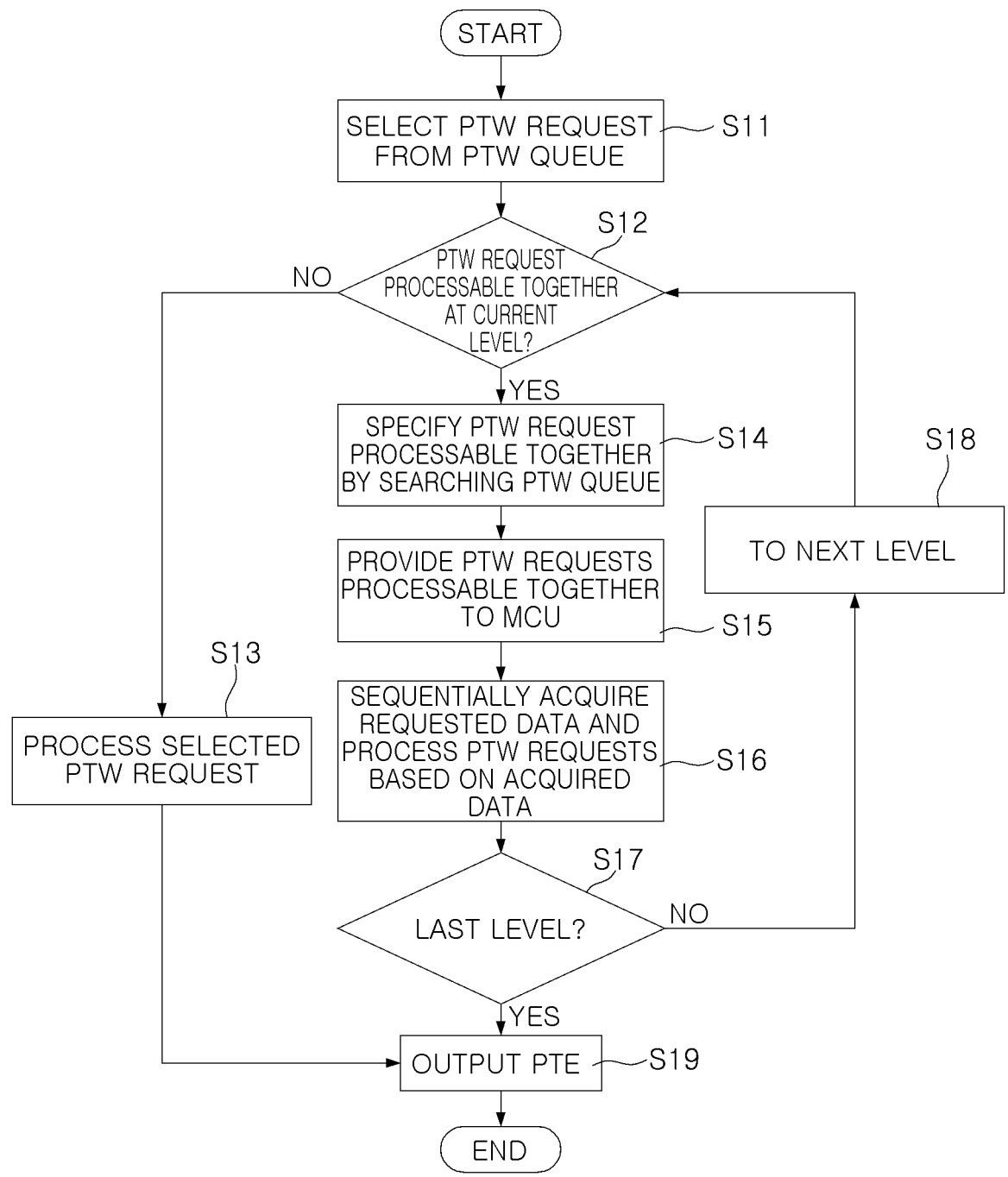
FIG. 11 is a flowchart illustrating a method of walking a page table according to an example embodiment of the present disclosure.

FIG. 11 is a flowchart illustrating a method of walking a page table according to an example embodiment of the present disclosure.

In operation S11, a PTW may select a page table walk request from a page table walk request queue.

In operation S12, the PTW may determine whether an associated page table walk request that may be processed together at a current search level of the selected page table walk request is queued in a page table walk request queue. For example, the PTW may determine whether the associated page table walk request is queued using the bloom filters 541, 542, and 543 described with reference to FIG. 10.

When the associated page table walk request is not queued in the page table walk request queue ("No" in operation S12), the PTW may process the selected page table walk request solely in operation S13. In operation S19, the PTW may output a target PTE to be found in the page table walk request, and may end an operation thereof.

When the associated page table walk request is queued in the page table walk request queue ("Yes" in operation S12), the PTW may search the page table walk request queue in operation S14 to specify an associated page table walk request that may be processed together with the selected page table walk request. For example, the PTW may determine a base address, depending on a current search level, in a virtual address of the selected page table walk request, and may find page table walk requests having the same base address, among page table walk requests queued in the page table walk request queue.

In operation S15, the PTW may specify cache lines in which data is stored in a memory cell row in which data corresponding to associated page table walk requests are stored, and may consecutively provide requests for the cache lines to an MCU. When the requests for the cache lines are consecutively provided to the MCU, a row buffer hit rate in the main memory may increase.

In operation S16, the PTW may sequentially acquire requested cache lines from the MCU, and may process the page table walk requests using the acquired cache lines.

In operation S17, it may be determined whether a search level of the associated page table walk requests is a last level.

When the search level is the last level ("Yes" in operation S17), the PTW may acquire PTEs for the associated page table walk requests. In operation S19, the PTW may output the PTEs for the associated page table walk requests, and may end an operation thereof.

When the search level is not the last level ("No" in operation S17), the PTW may acquire PTEs for the associated page table walk requests. In operation S18, the PTW may update the search level of the page table walk requests, queued in the page table walk request queue, to a next level, and may perform operation S11.

Figure 12A:
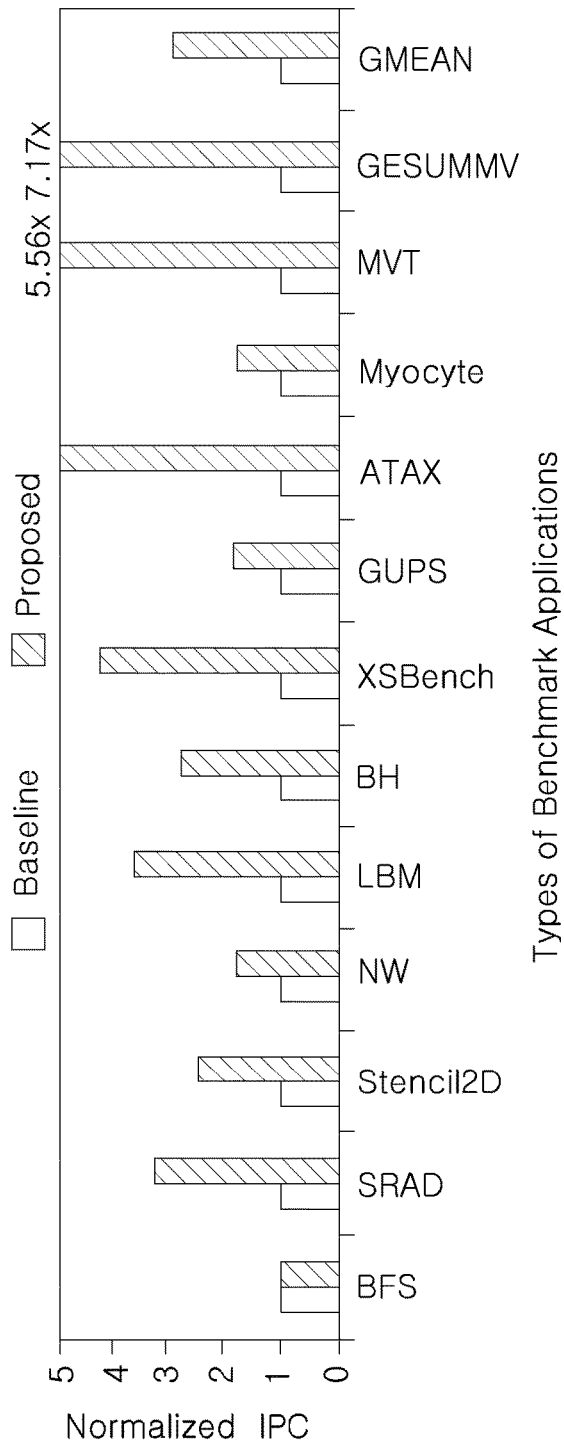
FIGS. 12A to 12C are diagrams illustrating the effect of a method of walking a page table according to an example embodiment of the present disclosure.
Figure 12B:
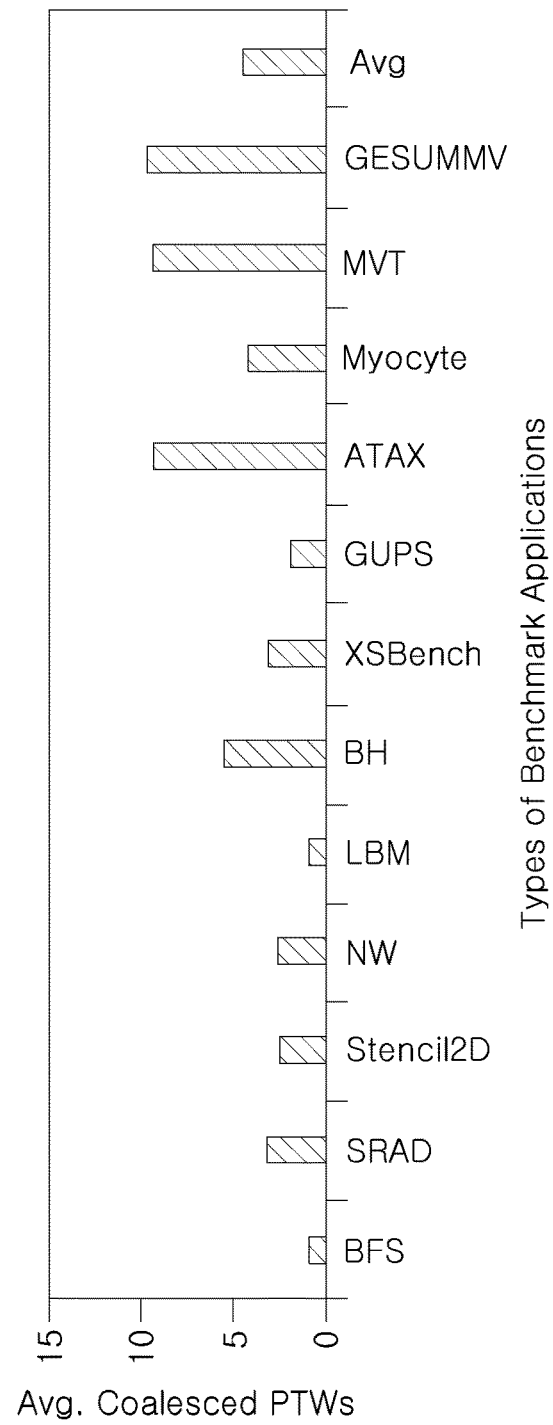
Figure 12C:
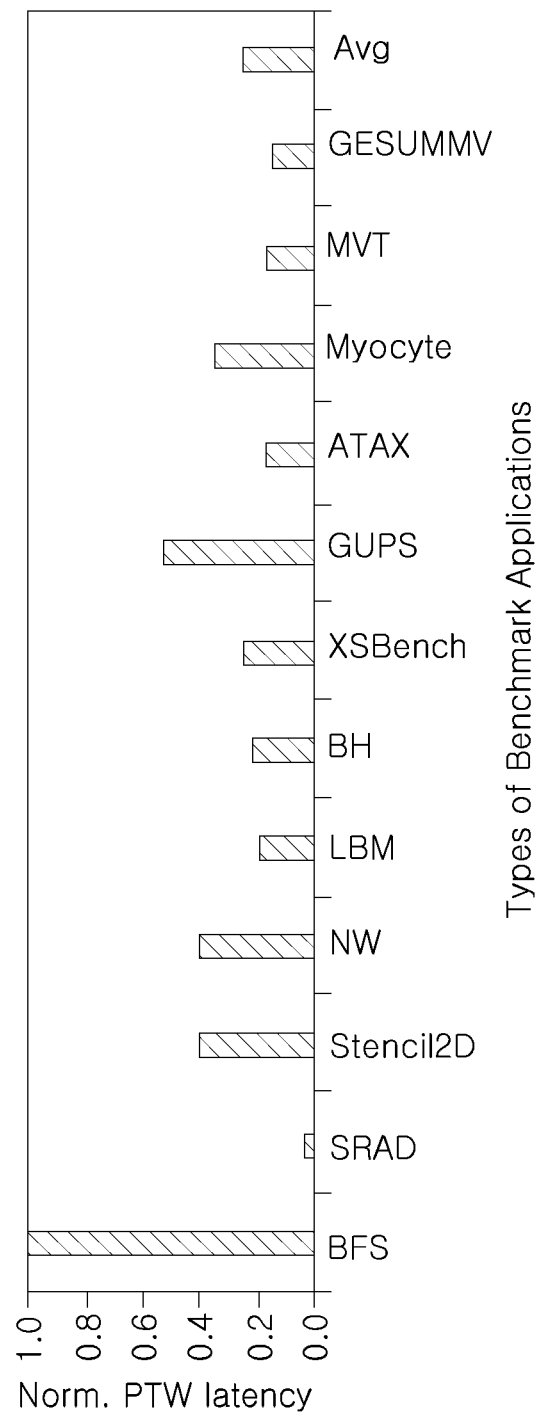

FIGS. 12A to 12C are diagrams illustrating the effect of a method of walking a page table according to an example embodiment of the present disclosure.

FIG. 12A illustrates instruction per cycle (IPC), using a GPU simulator, as performance of a GPU system according to a comparative example embodiment (illustrated in the figures as, "baseline") and an example embodiment (illustrated in the figures as, "proposed") of the present disclosure. In FIG. 12A, the IPC of the GPU system according to the example embodiment of the present disclosure may be represented as a standardized value based on the IPC according to the comparative example embodiment. The comparative example embodiment may represent an example in which a PTW in a GPU system processes each page table walk request solely without processing associated page table walk requests together.

Referring to FIG. 12A, when various benchmark applications (BFS, SRAD, Stencil2D, NW, LBM, BH, XSBench, GUPS, ATAX, Myocyte, MVT, GESUMMV, and GMEAN) are driven by a GPU simulator, the GPU system, according to the example embodiment of the present disclosure, shows high performance in most cases.

On average, the GPU system, according to the example embodiment of the present disclosure, may have 2.93 times greater performance. For example, the GPU system, according to the example embodiment of the present disclosure, may have higher performance as a TLB miss rate thereof is higher and address patterns of page table walk requests are more irregular. For example, the GPU system may be expected to have high performance, when the GPU system performs a graphical operation or scientific operation, or computes a recommendation system operated on a processor or applications having a sparse memory access pattern.

FIG. 12B illustrates simulation results of the average number of page table walk requests processed at one time by the PTW, according to an example embodiment of the present disclosure. The simulation results may be acquired by driving, by a GPU simulator, various benchmark applications (BPF, SRAD, Stencil2D, NW, LBM, BH, XSBench, GUPS, ATAX, Myocyte, MVT, and GESUMMV).

Referring to FIG. 12B, according to simulation results of benchmark applications such as ATAX, MVT, and GESUMMV, nearly 10 page table walk requests may be processed at one time. Even on average (illustrated in the figures as, "Avg."), a PTW according to an example embodiment of the present disclosure may process four or more page table walk requests at one time.

FIG. 12C illustrates simulation results of latency required for a PTW to process one page table walk request according to an example embodiment of the present disclosure. The simulation results may be acquired by driving, by a GPU simulator, various benchmark applications (BPF, SRAD, Stencil2D, NW, LBM, BH, XSBench, GUPS, ATAX, Myocyte, MVT, and GESUMMV). In FIG. 12C, latency may be represented as a relative value based on a comparative example embodiment.

Referring to FIG. 12C, latency required to process a page table walk request may be reduced in most benchmark application execution results.

In FIGS. 2 to 11, example embodiments of the present disclosure are described by exemplifying a case in which a size of a memory cell row and a size of a virtual page are the same. However, the present disclosure may also be applied to a case in which a size of a memory cell row and a size of a virtual page are different from each other.

Figure 13A:
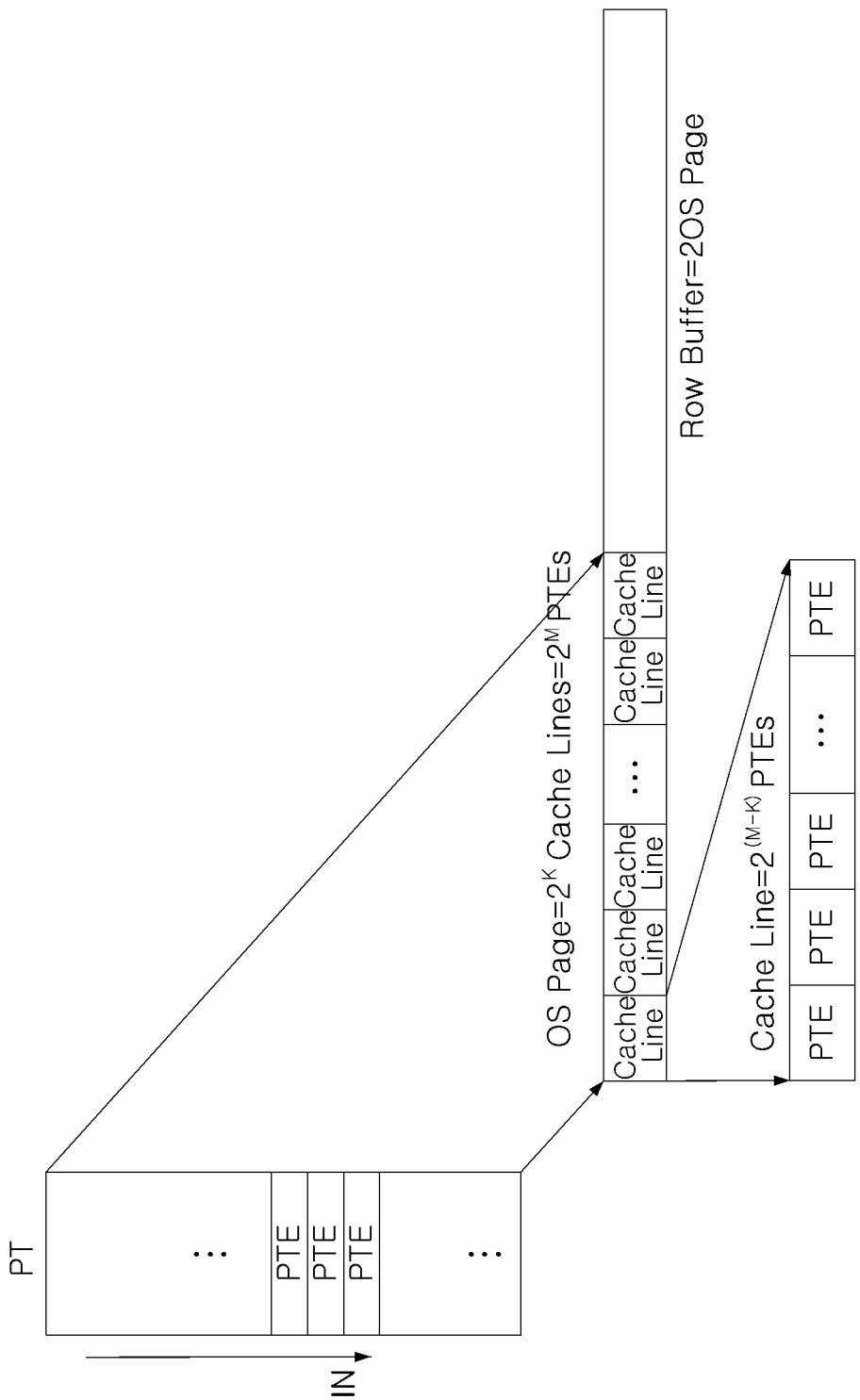
FIGS. 13A and 13B are diagrams illustrating associated PTEs according to example embodiments of the present disclosure.
Figure 13B:
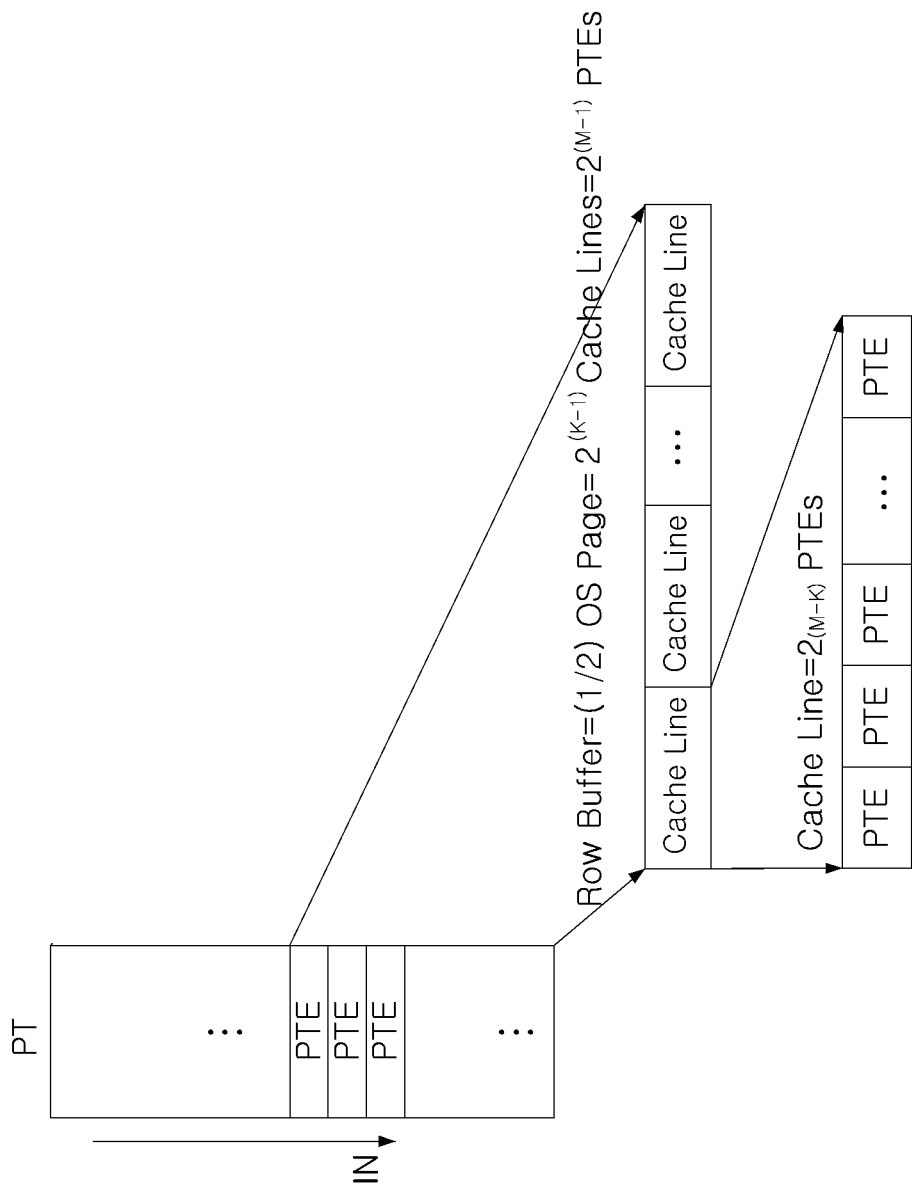

FIGS. 13A and 13B are diagrams illustrating associated PTEs according to example embodiments of the present disclosure.

In a similar manner to FIG. 4, FIG. 13A illustrates one page table PT among page tables that may be stored in a main memory, a row buffer, and a cache line.

Referring to FIG. 13A, a case in which the size of a memory cell row, for example, a size of a row buffer is twice greater than a size of a virtual page allocated by an OS is exemplified. For example, the size of the virtual page may be 4 KB and the size of the row buffer may be 8 KB.

In the example of FIG. 13A, one row buffer may buffer two virtual pages. However, virtual page numbers VPN of the two virtual pages that may be buffered in one row buffer might not necessarily be consecutive. For example, two virtual pages for consecutive virtual addresses might not necessarily be buffered in one row buffer.

According to an example embodiment of the present disclosure, when the size of the row buffer is greater than the size of the virtual page, a PTW may determine associated PTEs based on the size of the virtual page. For example, the PTW may determine requests for PTEs stored in one page table PT as associated page table walk requests, and may process the associated page table walk requests together.

FIG. 13B illustrates one page table PT among page tables that may be stored in a main memory, a row buffer, and a cache line.

Referring to FIG. 13B, a case in which a size of a memory cell row, for example, a size of a row buffer is ½ times a size of a virtual page allocated by an OS is exemplified. For example, the size of the virtual page may be 4 KB and the size of the row buffer may be 2 KB.

In the example of FIG. 13B, PTEs corresponding to half of a page table PT may be buffered in one row buffer, and PTEs of the other half might not be buffered in the one row buffer.

According to an example embodiment of the present disclosure, when a size of a row buffer is less than a size of a virtual page, a PTW may determine associated PTEs based on the size of the row buffer. For example, the PTW may determine requests for PTEs stored in the half of the page table PT as associated page table walk requests, and may process the associated page table walk requests together. For example, when a size of one PTE is 8 bytes, 256 PTEs may be buffered in one row buffer. When $2^M$ PTEs are buffered in one page table PT, $2^{(M-1)}$ PTEs may be buffered in one row buffer. Whether PTEs are stored in the same memory cell row may be determined depending on whether high-order (N−M+1)-bit addresses of an N-digit virtual page number VPN are the same.

Even when the size of the memory cell row and the size of the virtual page are different from each other, the PTW may consecutively process page table walk requests corresponding to virtual addresses having addresses adjacent to each other, the page table walk requests for PTEs that may be stored in one memory cell row, thereby rapidly processing the page table walk requests.

A method of walking a page table and an MMU according to an example embodiment of the present disclosure may increase a row buffer hit rate in a main memory by adjusting a processing order of page walk requests.

The method of walking a page table and the MMU according to an example embodiment of the present disclosure may alleviate a bottleneck in a process by rapidly processing a plurality of page walk requests.

The issues to be resolved by the present disclosure are not necessarily limited to those set forth above, and other issues not described will be clearly understood by those skilled in the art from the following description.

While example embodiments have been illustrated and described above, it will be apparent to those skilled in the art that modifications and variations could be made without departing from the scope of the present disclosure.

What is claimed is:

1. A memory management unit, comprising:
   a translation lookaside buffer (TLB) configured to cache page table entries (PTEs) including a mapping relationship between a virtual page number and a physical frame number, and further configured to convert a virtual address received from a processor into a physical address of a main memory using the cached PTEs;
   a page table walk request queue configured to queue page table walk requests corresponding to a virtual page number included in the virtual address when a TLB miss has occurred; and
   one or more page table walkers (PTWs) configured to acquire, based on virtual page numbers of the page table walk requests, a PTE from the main memory, and to convert the virtual page numbers into physical frame numbers using the PTE,
   wherein a PTW, selected from among the one or more PTWs, is configured to select, from among the page table walk requests queued in the page table walk request queue, associated page table walk requests having a same base address of corresponding virtual page numbers, to consecutively provide, to the main memory, cache line requests for acquiring PTEs corresponding to the associated page table walk requests, to acquire, from cache lines acquired from the main memory, the PTEs corresponding to the associated page table walk requests, and to provide the acquired PTEs to the TLB.

2. The memory management unit of claim 1, wherein the selected PTW is configured to:
   determine, based on a size of a virtual page allocated to one virtual page number and a size of a PTE, a number of PTEs that may be stored in one virtual page as $2^M$ (where M is a positive integer); and
   determine, in the virtual page number that is N bits (where N is a positive integer), a high-order (N−M) bit-address as the base address.

3. The memory management unit of claim 1, wherein the selected PTW is configured to:
   determine, based on a size of a row buffer of the main memory and a size of a PTE, the number of PTEs that may be stored in the row buffer as $2^M$ (where M is a positive integer); and
   determine a high-order (N−M) bit-address as the base address in the virtual page number that is N bits (where N is a positive integer).

4. The memory management unit of claim 3, wherein the selected PTW is configured to specify cache lines for acquiring the PTEs using a high-order K-bit address, among low-order M-bit addresses, in the virtual page number, when the number of cache lines included in the row buffer is $2^K$ (where K is a positive integer).

5. The memory management unit of claim 1, wherein the selected PTW is configured to:
   determine, based on a smaller size, among a size of a virtual page allocated to one virtual page number and a size of a row buffer of the main memory, and a size of a PTE, a number of PTEs that may be stored in one virtual page or one row buffer as $2^M$ (where M is a positive integer); and
   determine a high-order (N−M) bit-address as the base address in the virtual page number that is N bits (where N is a positive integer).

6. The memory management unit of claim 1, wherein the selected PTW is configured to:
   determine a page directory entry (PDE) indicating a page table in which a target PTE corresponding to a virtual page number is stored, among a plurality of page tables, by searching a page directory using high-order bits of the virtual page number, and determine the target PTE by searching the page table using low-order bits excluding the high-order bits of the virtual page number; and
   determine the high-order bits of the virtual page number as the base address.

7. The memory management unit of claim 1, wherein the selected PTW is configured to select one page table walk request among a plurality of page table walk requests queued in the page table walk request queue, and to select page table walk requests having a base address that is the same as a base address of the one page table walk request by searching the page table walk request queue as the associated page table walk requests.

8. The memory management unit of claim 7, further comprising:
   a bloom filter configured to determine whether there is an address that is the same as the base address of the one page table walk request, among base addresses of the plurality of page table walk requests queued in the page table walk request queue, when the base addresses of the plurality of page table walk requests queued in the page table walk request queue are inserted and the base address of the one page table walk request is input.

9. The memory management unit of claim 7, wherein the selected PTW is configured to exclude a page table walk request for which processing is started by another PTW, among the plurality of page table walk requests, from search targets of the page table walk request queue.

10. The memory management unit of claim 1, wherein the selected PTW is configured to acquire a PTE by performing a multi-level search on a multi-level page table, and to determine a base address at a certain search level as an address indicating a page directory or page table searched at the search level.

11. The memory management unit of claim 10, further comprising:
a plurality of bloom filters depending on search levels of the multi-level search,
wherein base addresses of the plurality of page table walk requests queued in the page table walk request queue, determined depending on the search level, are inserted into the bloom filters, respectively.

12. The memory management unit of claim 1, wherein the one or more PTWs include:
a search logic configured to select one of the page table walk requests queued in the page table walk request queue, and to select associated page table walk requests having a base address that is the same as a base address of the selected page table walk request;
an associated request storage unit configured to store the associated page table walk requests selected by the search logic;
a cache line determination logic configured to determine, from among a plurality of cache lines included in a row buffer of the main memory, cache lines from which PTEs corresponding to the associated page table walk requests stored in the associated request storage unit are to be acquired;
a cache line request logic configured to consecutively provide, to the main memory, requests for the determined cache lines; and
a page table walk request processing logic configured to acquire the corresponding PTEs from the cache lines acquired from the main memory.

13. The memory management unit of claim 12, wherein the memory management unit is an input-output memory management unit (IOMMU) electrically connected to an external processor, and is configured to selectively inactivate the search logic in the one or more PTWs depending on a processor type of the external processor.

14. The memory management unit of claim 13, wherein the memory management unit is configured to selectively inactivate the search logic in the one or more PTWs depending on a parallel processing capability of the external processor.

15. A memory management unit, comprising:
a page table walker (PTW) configured to acquire, based on a virtual page number of a page table walk request, a page table entry (PTE) from a main memory; and
a page table walk request queue configured to queue a plurality of page table walk requests,
wherein the PTW is configured to determine, based on virtual page numbers of the page table walk requests queued in the page table walk request queue, associated page table walk requests, among the page table walk requests, in which a corresponding PTE is stored in a same memory cell row of the main memory, and to consecutively provide, to the main memory, access requests for processing the associated page table walk requests.

16. The memory management unit of claim 15, wherein the PTW is configured to:
determine, based on a size of one memory cell row of the main memory and a size of one PTE, the number of PTEs that may be stored in the memory cell row as $2^M$ (where M is a positive integer), and determine, as the associated page table walk requests, page table walk requests corresponding to virtual addresses having a same high-order (N−M) bits, among N-bit virtual page numbers (where N is a positive integer).

17. The memory management unit of claim 15, wherein the PTW is configured to determine a number of PTEs that may be stored in a virtual page allocated to the virtual page number as $2^M$ (where M is a positive integer), and to determine page table walk requests corresponding to virtual addresses having a same upper (N−M) bits of an N-bit virtual page number (where N is a positive integer), as the associated page table walk requests, when a size of the virtual page is less than a size of one memory cell row of the main memory.

18. A method of walking a multi-level page table, the method comprising:
selecting one page table walk request from among a plurality of page table walk requests in a page table walk request queue, for finding a page table entry (PTE) corresponding to a virtual page number;
selecting one or more associated page table walk requests by searching the page table walk request queue, when an associated page table walk request having a base address that is the same as a base address of the selected page table walk request is queued in the page table walk request queue, at a current search level of the selected page table walk request;
specifying, in a memory cell row of a main memory in which data corresponding to the selected page table walk requests is stored, cache lines in which the data is stored, and consecutively providing requests for the cache lines to the main memory;
sequentially acquiring requested cache lines from the main memory, and processing the selected page table walk requests at the current search level using the acquired cache lines; and
outputting PTEs corresponding to the processed page table walk requests, when the current search level of the processed page table walk requests is a last level.

19. The method of claim 18, further comprising:
acquiring page directory entries (PDEs) corresponding to the processed page table walk requests, when the current search level of the processed page table walk requests is not the last level; and
updating, in the page table walk request queue, a level next to the current search level of the processed page table walk requests to a new current search level.

20. The method of claim 19, further comprising:
inserting a base address for each search level of a page table walk request queued in a page table walk request queue, into a bloom filter for each search level;
determining whether the one or more associated page table walk requests are queued in the page table walk request queue by inputting, to a bloom filter, a base address of the selected page table walk request at a current search level of the selected page table walk request; and removing a base address for each search level of a page table walk request, removed from the page table walk request queue, from the bloom filter for each search level.

\* \* \* \* \*